United States Patent
Stenneth et al.

(10) Patent No.: US 12,379,224 B2
(45) Date of Patent: Aug. 5, 2025

(54) IDENTIFYING VEHICLE FILLING STATIONS AND GENERATING RELATED VISUAL INDICATIONS

(71) Applicant: Microsoft Technology Licensing, LLC, Redmond, WA (US)

(72) Inventors: Leon Oliver Stenneth, Chicago, IL (US); Catalin Bogdan Capota, Chicago, IL (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 17/852,030

(22) Filed: Jun. 28, 2022

(65) Prior Publication Data

US 2023/0417571 A1    Dec. 28, 2023

(51) Int. Cl.
*G01C 21/00*    (2006.01)
*G01C 21/34*    (2006.01)

(52) U.S. Cl.
CPC ...... *G01C 21/3811* (2020.08); *G01C 21/3469* (2013.01); *G01C 21/3476* (2013.01); *G01C 21/3848* (2020.08); *G01C 21/3874* (2020.08)

(58) Field of Classification Search
None
See application file for complete search history.

(56) References Cited

U.S. PATENT DOCUMENTS

| | | | |
|---|---|---|---|
| 2017/0308974 A1* | 10/2017 | Adiga | G06Q 50/167 |
| 2020/0324667 A1* | 10/2020 | Yaldo | B60L 58/12 |
| 2020/0394668 A1* | 12/2020 | Zhang | G06Q 30/0205 |
| 2021/0318685 A1* | 10/2021 | Jenkins | G06Q 30/018 |
| 2022/0001763 A1 | 1/2022 | Chadha et al. | |
| 2022/0318859 A1* | 10/2022 | Telpaz | G06Q 30/0281 |
| 2022/0348104 A1* | 11/2022 | Brannan | G06Q 10/20 |

OTHER PUBLICATIONS

"International Search Report and Written Opinion Issued in PCT Application No. PCT/US23/022186", Mailed Date: Aug. 7, 2023, 14 Pages.

* cited by examiner

*Primary Examiner* — Hongye Liang

(57) ABSTRACT

Methods and systems for identifying vehicle filling stations and generating related visual indications are provided. In some examples, vehicle data is received that corresponds to a plurality of vehicles. From the vehicle data, a first subset of data is extracted that corresponds to location data and one of a fuel or charge level state change of each of the plurality of vehicles. One or more locations of one or more of the plurality of vehicles are identified, based on the location data, when the fuel or charge level state change corresponds to an increase in a fuel or charge level of the one or more of the plurality of vehicles. One or more visual indications are generated that correspond to the identified one or more locations.

20 Claims, 14 Drawing Sheets

IDENTIFYING VEHICLE FILLING STATIONS AND GENERATING RELATED VISUAL INDICATIONS

BACKGROUND

Examples of vehicle filling stations may include gas stations and/or electric vehicle charging stations. Filling stations may be used to refuel and/or recharge vehicles. New filling stations continue to be installed at a plurality of geographic locations.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for identifying vehicle filling stations (e.g., gas stations or electric vehicle charging stations). Further, aspects of the present disclosure relate to methods, systems, and media for generating visual indications corresponding to the identified vehicle filling stations.

In some examples, a method is provided. The method includes receiving vehicle data corresponding to a plurality of vehicles, extracting, from the vehicle data, a first subset of data corresponding to location data and one of a fuel or charge level state change of each of the plurality of vehicles, identifying one or more locations of one or more of the plurality of vehicles, based on the location data, when the fuel or charge level state change corresponds to an increase in a fuel or charge level of the one or more of the plurality of vehicles, and generating one or more visual indications corresponding to the identified one or more locations.

Some examples further include displaying one or more of the one or more visual indications on a map.

In some examples, the vehicle data is received at a remote server.

In some examples, the vehicle data is electric vehicle (EV) data corresponding to one or more electric vehicles. Further, the one or more visual indications correspond to one or more charging stations.

Some examples further include determining, based on the EV data, whether one or more charging stations are public or private. The one or more visual indications comprise an indication of whether the one or more charging stations are public or private.

In some examples, the vehicle data is gas vehicle data corresponding to one or more gas vehicles. Further, the one or more visual indications correspond to a gas station.

Some examples further include determining an estimated fill time until a fuel or charge level of the one or more of the plurality of vehicles is approximately 100%. The one or more visual indications comprise an indication of the estimated fill time.

In some examples, the fuel or charge level state changes corresponds to an increase in a fuel or charge level of the one or more of the plurality of vehicles that is greater than approximately 10%.

In some examples, the vehicle data includes a value for each of the one or more vehicles. Based on the respective value for each of the one or more vehicles and the first subset of data, a number of filling stations at the one or more locations is determined. The one or more visual indications correspond to the number of filling stations at the one or more locations.

Some examples further include comparing the one or more locations to a database. The database includes existing location information for one or more filling stations. Some examples further include determining, if one or more of the one or more locations does not correspond to the existing location information, that the one or more of the one or more locations corresponds to a new filling station, and generating an indication corresponding to the new filling station.

In some examples a method is provided. The method includes receiving a location of a filling station, receiving one or more of fuel or charge level state change data from one or more vehicles, calculating an estimated fill time until a fuel or charge level of the one or more vehicles is greater than or equal to a predetermined threshold, and generating an indication corresponding to the location of the filling station and the estimated fill time.

Some examples further include displaying the indication on a map.

In some examples, the predetermined threshold is one of about 50% of a fuel or charge capacity of each of the one or more vehicles, about 75% of a fuel or charge capacity of each of the one or more vehicles, or about 100% of a fuel or charge capacity of each of the one or more vehicles.

In some examples, the filling station is a gas station, the one or more vehicles are gas vehicles, and the indication corresponds to the location of the gas station and the estimated fill time.

In some examples, the filling station is a charging station, the one or more vehicles are electric vehicles, and the indication corresponds to the location of the charging station and the estimated fill time.

In some examples, a method is provided. The method includes transmitting vehicle data. The vehicle data includes location data and one or more of fuel or charge level state change data.

The method further includes receiving one or more indications corresponding to one or more locations of filling stations, based on the vehicle data, and displaying the one or more indication.

In some examples, the one or more indications are displayed on an infotainment system of a vehicle.

In some examples, the one or more indications are displayed on a mobile computing device.

In some examples, the one or more indications correspond to one or more of private charging stations or public charging stations. If one or more of the one or more indications correspond to private charging stations, the method includes not displaying the one or more of the one or more indications that correspond to the private charging stations.

In some examples, the one or more indications are displayed on a map, based on geographic locations corresponding to the one or more indications.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
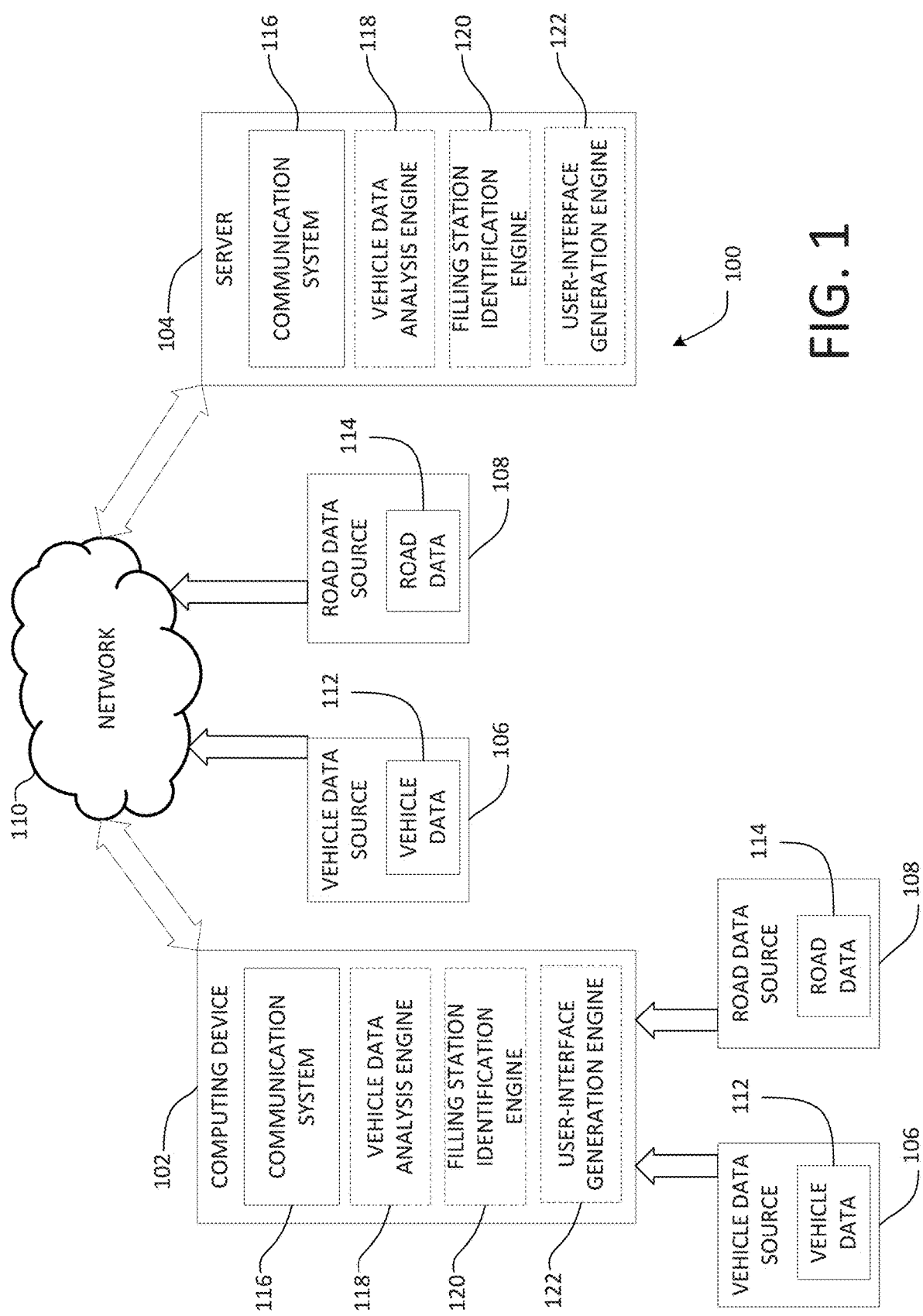
FIG. 1 illustrates an overview of an example system according to some aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents. Further, throughout the disclosure, the terms "about", "substantially", and "approximately" mean plus or minus 5% of the number or geometric constraint that each term precedes. For example, about 100 may mean 100+/5.

The evolution of cloud computing technology has significantly increased the amount of computations that are able to be performed remotely. Some examples of computations that may be performed on one or more remote servers (e.g., the cloud) include algorithms for identifying filling stations (e.g., gas stations or charging stations), characteristics of filling stations, and indications related to the filling stations or characteristics thereof. Each of the algorithms may be based on vehicle sensor data. This data can be transmitted in real-time from one or more vehicles, to the cloud, for processing. Similarly, historical vehicle sensor data, from several vehicles, can be stored in the cloud and datamined for context inference and/or map learning.

Concurrent to the evolution of cloud computing technology, vehicles (e.g., cars, trucks, buses, electric vehicles, gas-powered vehicles, etc.) are being manufactured with an increasing number of sensors. Modern vehicles may include sensors that generate vehicle data and/or from which vehicle data may be obtained. For examples, sensors may include a global positioning system (GPS), a fuel or charge level reader, a camera, etc. Further, vehicle data that is received from, or generated based on, the sensors may include a fuel or charge level, a change in fuel or charge level, fuel or charge capacity of a vehicle, location of a vehicle, unique vehicle value (which is anonymous, and may change, such as based on distance travelled by a vehicle, geographic limitations, periods of time, etc.), camera data, etc. Additional, and/or alternative, vehicle data that may be obtained or derived from sensors or equipment that may be found in modern-day vehicles may be recognized by those of ordinary skill in the art.

Electric vehicles have become increasingly popular in recent years. To meet the rising demand of electric vehicles, electric vehicle (EV) charging stations are being rapidly deployed, globally. Drivers of electric vehicles may desire to look-up the location of charging stations to recharge their vehicles, as they drive However, due to the rapid deployment of EV charging stations, companies that develop and/or manage mapping services, such as mapping software, may not be aware of the locations of new EV charging stations. Accordingly, there exists a need to identify new EV charging stations in any mapping or routing software.

Similar mechanisms as described herein with respect to electric vehicles and EV charging stations may also apply to other types of vehicles and filling stations. For example, a driver of a gas-powered vehicle may desire to locate a gas station. However, companies that develop and/or manage mapping services, such as mapping software, may not have up-to-date information regarding the location of gas stations. Accordingly, there exists a need to identify any of a plurality of different filling stations, such as gas stations and/or charging stations.

As mentioned above, examples of vehicle filling stations may include gas stations and/or electric vehicle charging stations. Filling stations may be used to refuel and/or recharge vehicles, such as gas-powered vehicle or electric vehicles. New filling stations continue to be installed at any of a plurality of geographic locations. Identifying or locating filling stations, such as new filling stations, can be important for travel logistics and/or map visualization.

Accordingly, some aspects of the present disclosure relate to methods, system, and media for identifying filling stations using vehicle sensor data. Generally, vehicle data may be received that corresponds to a plurality of vehicles. A first subset of data (e.g., location data, fuel level state change data, charge level state change data, etc.) may be extracted from the vehicle data. When the first subset of data corresponds to an increase in a fuel or charge level of the one or more of the plurality of vehicles, one or more locations of one or more of the plurality of vehicles may be identified, based on the location data. The one or more locations may correspond to one or more filling stations (e.g., gas stations or charging stations).

Further, some aspects of the present disclosure relate to methods, systems, and media for generating indications corresponding to filling stations. Generally, on a server-side, a location of a filling station may be received. Further, one or more of fuel or charge level state change data may be received from one or more vehicles. An estimated fill time until a fuel or charge level of the one or more vehicles is greater than or equal to a predetermined threshold may be calculated. Further, an indication corresponding to the location of the filling station and the estimated fill time may be generated.

Additionally, or alternatively, generally, on a local-side, vehicle data may be transmitted. The vehicle data may include location data and one or more of fuel or charge level state change data. Based on the vehicle data, one or more indications corresponding to one or more locations of filling stations may be received. The indications may be displayed, such as on an infotainment system of a vehicle, a mobile computing device, or another computing device, as described further herein.

Advantages of mechanisms disclosed herein may include an improved ability to identify filling stations, using vehicle data. Further advantages may include improved user engagement through a more specific user-interface that provides indications corresponding to filling stations (e.g., in real time). Further advantages may be apparent to those of ordinary skill in the art, at least in light of the non-limiting examples described herein.

FIG. 1 shows an example of a system 100, in accordance with some aspects of the disclosed subject matter. The system 100 may be a system for identifying a location of one or more filling stations (e.g., gas stations and/or charging stations). Additionally, or alternatively, the system 100 may be a system for generating visual indications (e.g., via a user-interface) corresponding to one or more filling stations (e.g., in real-time). The system 100 includes one or more computing devices 102, one or more servers 104, a vehicle data source 106, a road data source 108, and a communication network or network 110. The computing device 102 can receive vehicle data 112 from the vehicle data source 106, which may be, for example a vehicle (e.g., a car, truck, bus, autonomous vehicle, gas vehicle, electric vehicle, hybrid vehicle, etc.) that transmits vehicle data, a computer-executed program that generates vehicle data, and/or memory with data stored therein corresponding to vehicle data. The vehicle data 112 may include speed data, direction data, location data, time data, battery (e.g., charge level) data, fuel level data, door sensor data, seat data, seatbelt data, weather data (e.g., from an in-vehicle thermometer or other weather-related sensor), and/or other vehicle sensor data that may be recognized by those of ordinary skill in the art.

Additionally, or alternatively, the network 110 can receive vehicle data 112 from the vehicle data source 106, which may be, for example a vehicle (e.g., a car, truck, bus, autonomous vehicle, gas vehicle, electric vehicle, hybrid vehicle, etc.) that transmits vehicle data, a computer-executed program that generates vehicle data, and/or memory with data stored therein corresponding to vehicle data. The vehicle data 112 may include speed data, direction data, location data, time data, battery (e.g., charge level) data, fuel level data, door sensor data, seat data, seatbelt data, weather data (e.g., from an in-vehicle thermometer or other weather-related sensor), and/or other vehicle sensor data that may be recognized by those of ordinary skill in the art.

Further, the computing device 102 can receive road data 114 from the road data source 108, which may be, for example, a service that provides road data, a computer-executable program that generates road data, and/or memory with data stored therein corresponding to road data. The road data 114 may include information corresponding to the geographic location of one or more roads, geographic locations of filling stations (e.g., relative to one or more roads), an elevation of one or more roads (e.g., if a road includes a bridge, if two or more roads overlay each other, etc.), one or more different types of roads, such as highways, tollways, alleyways, local roads, country roads, etc. Additional, and/or alternative, road data may be recognized by those of ordinary skill in the art.

Additionally, or alternatively, the network 110 can receive road data 114 from the road data source 108, which may be, for example, a service that provides road data, a computer-executable program that generates road data, and/or memory with data stored therein corresponding to road data. The road data 114 may include information corresponding to the geographic location of one or more roads, geographic locations of filling stations (e.g., relative to one or more roads), an elevation of one or more roads (e.g., if a road includes a bridge, if two or more roads overlay each other, etc.), one or more different types of roads, such as highways, tollways, alleyways, local roads, country roads, etc. Additional, and/or alternative, road data and how to obtain such road data may be recognized by those of ordinary skill in the art.

Computing device 102 may include a communication system 116, a vehicle data analysis engine or component 118, a filling station identification engine or component 120, and/or a user-interface generation engine or component 122. In some examples, computing device 102 can execute at least a portion of the vehicle data analysis component 118 to collect and/or analyze data from one or more vehicle sensors, such as data corresponding to a fuel or charge level, a change in a fuel or charge level, a fuel or charge capacity of a vehicle, a location of a vehicle (e.g., a GPS location), a unique vehicle value (which is anonymous, and may change, such as based on distance travelled by a vehicle, geographic limitations, periods of time, etc.), camera data, etc. Further, in some examples, computing device 102 can execute at least a portion of the filling station identification component 120 to identify a filling station at a location, identify how many filling stations are at a location, identify a maintenance status of one or more filling stations, identify an estimated fill time of a vehicle at a filling stations, and/or identify whether a filling station is private or public. Further, in some examples, computing device 102 can execute at least a portion of user-interface component 122 to generate a map, generate an indication corresponding to a calculated fill time, generate an indication corresponding to a filling station, and/or update a user-interface based on one or more generated indications (e.g., corresponding to the filling stations and/or fill times).

Server 104 may include a communication system 116, a vehicle data analysis engine or component 118, a filling station identification engine or component 120, and/or a user-interface generation engine or component 122. In some examples, server 104 can execute at least a portion of the vehicle data analysis component 118 to collect and/or analyze data from one or more vehicle sensors, such as data corresponding to a fuel or charge level, a change in a fuel or charge level, a fuel or charge capacity of a vehicle, a location of a vehicle (e.g., a GPS location), a unique vehicle value (which is anonymous, and may change, such as based on distance travelled by a vehicle, geographic limitations, periods of time, etc.), camera data, etc. Further, in some examples, server 104 can execute at least a portion of the filling station identification component 120 to identify a filling station at a location, identify how many filling stations are at a location, identify a maintenance status of one or more filling stations, identify an estimated fill time of a vehicle at a filling stations, and/or identify whether a filling station is private or public. Further, in some examples, server 104 can execute at least a portion of user-interface component 122 to generate a map, generate an indication corresponding to a calculated fill time, generate an indication corresponding to a filling station, and/or update a user-interface based on one or more generated indications (e.g., corresponding to the filling stations and/or fill times).

Additionally, or alternatively, in some examples, computing device 102 can communicate data received from vehicle data source 106 and/or road data source 108 to the server 104 over a communication network 110, which can execute at least a portion of vehicle analysis data component 118, filling station identification component 120, and/or user-interface generation component 122. In some examples, vehicle data analysis component 118 may execute one or more portions of methods/processes 700 and/or 900 described below in connection with FIGS. 7 and 9, respectively. Further, in some examples, filling station identification component 120 may execute one or more portions of methods/processes 700 and/or 900 described below in connection with FIGS. 7 and 9, respectively. Further, in some examples, user-interface generation component 122 may execute one or more portions of methods/processes 700 and/or 900 described below in connection with FIGS. 7 and 9, respectively.

In some examples, computing device 102 and/or server 104 can be any suitable computing device or combination of devices that may be used by a requestor, such as a desktop computer, a vehicle computer (e.g., an infotainment system), a mobile computing device (e.g., a laptop computer, a smartphone, a tablet computer, a wearable computer, etc.), a server computer, a virtual machine being executed by a physical computing device, a web server, etc. Further, in some examples, there may be a plurality of computing device 102 and/or a plurality of servers 104.

In some examples, vehicle data source 106 can be any suitable source of vehicle data (e.g., sensor data generated from one or more sensors of a vehicle, vehicle data recorded by a user, vehicle data obtained from a database of aggregated information from one or more vehicles, etc.). In a more particular example, vehicle data source 106 can include memory storing vehicle data (e.g., local memory of computing device 102, local memory of server 104, cloud storage, portable memory connected to computing device 102, portable memory connected to server 104, etc.).

In another more particular example, vehicle data source 106 can include an application configured to generate vehicle data. In some examples, vehicle data source 106 can be local to computing device 102. Additionally, or alternatively, vehicle data source 106 can be remote from computing device 102 and can communicate vehicle data 112 to computing device 102 (and/or server 104) via a communication network (e.g., communication network 110).

In some examples, road data source 108 can be any suitable source of road data (e.g., a government, corporate, or other type of data store containing road data). In a more particular example, road data source 108 can include memory storing road data (e.g., local memory of computing device 102, local memory of server 104, cloud storage, portable memory connected to computing device 102, portable memory connected to server 104, etc.).

In another more particular example, road data source 108 can include an application configured to generate road data. In some examples, road data source 108 can be local to computing device 102. Additionally, or alternatively, road data source 108 can be remote from computing device 102 and can communicate road data 114 to computing device 102 (and/or server 104) via a communication network (e.g., communication network 110).

In some examples, communication network 110 can be any suitable communication network or combination of communication networks. For example, communication network 110 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 110 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
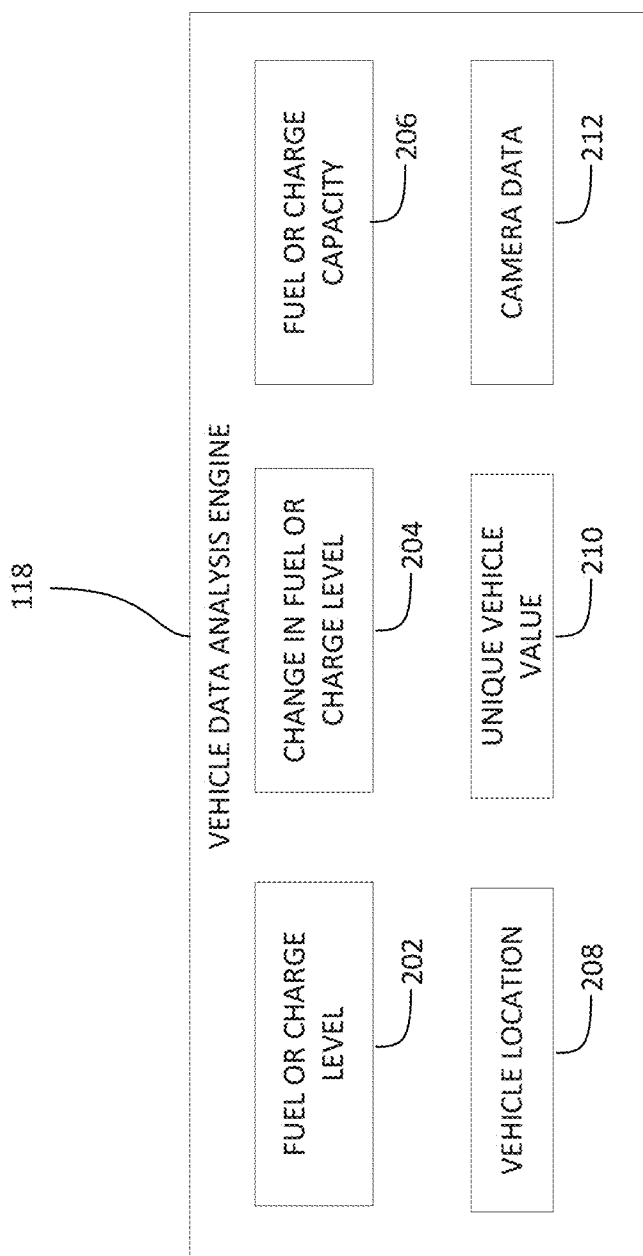
FIG. 2 illustrates a detailed schematic of a portion of the example system of FIG. 1 according to some aspects described herein.

FIG. 2 illustrates a detailed schematic of the vehicle data analysis component or engine 118 of the example system 100. The vehicle data analysis component 118 includes a plurality of components or engines that implement various aspects of the vehicle data analysis component 118. For example, the vehicle data analysis component 118 can include a fuel or charge level component 202, a change in fuel or charge level component 204, a fuel or charge capacity component 206, a vehicle location component 208, a unique vehicle value component 210 (which is anonymous, and may change, such as based on distance travelled by a vehicle, geographic limitations, periods of time, etc.), and a camera data component 212. The plurality of components of the vehicle data analysis engine 118 may store information that is parsed or otherwise determined from vehicle data (e.g., vehicle data 112).

The fuel or charge level component 202 may contain (e.g., stored in a memory location corresponding to the fuel or charge level component 202), and/or generate an indication of a fuel or charge level of one or more vehicles (e.g., a single vehicle, or each of a plurality of vehicles). For example, a vehicle may include a sensor that detects a level of fuel or charge in a vehicle. If the level of fuel or charge is a level of fuel, then the level of fuel may be a volumetric metric (e.g., gallons, liters, etc.). Additionally, or alternatively, the level of fuel may be a relative measurement of fuel with respect to a fuel capacity of a vehicle, such as about 10% full, or about 20%, or about 30% full, or about 40% full, or about 50% full, or about 60% full, or about 70% full, or about 80% full, or about 100%, etc.

Alternatively, if the level of fuel or charge is a level of charge, then the level of charge may be a measure of electric potential (e.g., volts, etc.). Additionally, or alternatively, the level of charge may be a relative measurement of charge with respect to a charge capacity of a vehicle, such as about 10% full, or about 20%, or about 30% full, or about 40% full, or about 50% full, or about 60% full, or about 70% full, or about 80% full, or about 100%, etc.

The change in fuel or charge level component 204 may contain (e.g., stored in a memory location corresponding to the change in fuel or charge level component 204), and/or generate an indication of a change in fuel or charge level of one or more vehicles (e.g., a single vehicle, or each of a plurality of vehicles). For example, a vehicle may include a sensor that detects whether a fuel or charge level is increasing or decreasing. Further, a vehicle may include a sensor that detects by how much a fuel or charge level is increasing or decreasing. Additionally, or alternatively, the change in fuel or charge level may be determined based on a plurality of fuel or charge levels (e.g., from the fuel or charge level component 202) with respect to time.

Accordingly, fuel or charge level data may be received or stored with a corresponding time stamp, and a change in the fuel or charge level, with respect to a change in the corresponding time stamp, may be used to calculate the change in fuel or charge level (e.g., as a magnitude and/or direction of change in the fuel or charge level).

Generally, the charge in fuel or charge level component 204 may be used to determine if a fuel or charge level of one or more vehicles is/are increasing, and in some examples, by how much. Based on the increase in fuel or charge level, it may be determined that one or more vehicles are at a filling station, using mechanisms described herein.

The fuel or charge capacity component 206 may contain (e.g., stored in a memory location corresponding to the fuel or charge capacity component 206), and/or generate an indication of a fuel or charge capacity level of one or more vehicles (e.g., a single vehicle, or each of a plurality of vehicles). In a gas vehicle, the fuel capacity level may be the amount of fuel that can be filled in one or more gas tanks of the gas vehicle. In an electric vehicle, the charge capacity level may be the maximum voltage that can be held within one or more batteries of the electric vehicle. The fuel or charge capacity vehicle may be pre-determined for one or more vehicles. The pre-determined fuel or charge capacity may be parsed from vehicle data (e.g., vehicle data 112). Further, the fuel or charge capacity can be useful for determining a relative fuel or charge level (e.g. via fuel or charge level component 202).

The vehicle location component 208 may contain (e.g., stored in a memory location corresponding to the vehicle location component 208), and/or generate an indication of a location of one or more vehicles (e.g., a single vehicle, or each of a plurality of vehicles). The vehicle location may be determined from a global positioning unit (GPS) of a vehicle, a satellite system (e.g. GPS, Glonass, etc.), and/or a visual position system (e.g., using the camera data component 212). The location component 208 may determine the location of one or more vehicles with a relatively high accuracy (e.g., within 10 centimeters of an actual location of the one or more vehicles, when using a GPS). The location of the one or more vehicle may be geographic coordinate points (e.g., latitude or longitude). Additionally, or alternatively, the vehicle location component 208 may determine a street address corresponding to the one or more vehicle based on road data (e.g., road data 114).

Mechanisms disclosed herein may be used to identify locations of relatively new filling stations. Therefore, in some examples, the filling stations may be located on roads that are not yet contained within databases that track road data. Accordingly, in some examples, it may be beneficial to determine a location of one or more filling stations, independent of road data, based on geographic coordinate points.

The unique vehicle value component 210 may contain (e.g., stored in a memory location corresponding to the unique vehicle value component 210), and/or generate an indication of a unique value corresponding to a source of vehicle data (e.g., vehicle data 210). The unique value is anonymous, and used to differentiate between sets of vehicle data obtained from different sources (e.g., vehicles). For example, if first and second vehicles are located at the same location (e.g., based on the vehicle location component 208), it may be useful to have a first unique value for a first set of data corresponding to the first vehicle, and a second unique value for a second set of data corresponding to the second vehicle, such that analyses described herein can be performed.

The unique value may change after an initial instantiation to anonymize vehicle data that is received. For example, the unique value may change as a vehicle moves from a first geographic position to a second geographic position (e.g., based on the vehicle location component 208). Additionally, or alternatively, the unique value may change based on distance travelled by a vehicle, such that after a vehicle travels a configurable or randomized distance, a new unique value corresponding to a specific set of vehicle data is generated. Additionally, or alternatively, the unique value may be updated after certain periods or durations of time to further anonymize vehicle data.

The camera data component 212 may contain (e.g., stored in a memory location corresponding to the camera data component 212), and/or generate an indication of camera data (e.g., visual data) that is received from one or more cameras on a vehicle. The camera data may be used, in supplement to other mechanisms described herein. For example, visual processing may be performed on the camera data to identify filling stations. Namely, a machine learning model may be trained to recognize filling stations within videos and/or still images.

Generally, the vehicle data analysis component 118 collects, stores, and/or analyzes vehicle data (e.g., vehicle data 112) that may be gathered from a plurality of vehicle sensors, such as batteries, fuel tanks, location systems, cameras, vehicle computers, etc. The vehicle data analysis component 118 may help to collect, store, and/or analyze vehicle data to identify (e.g., locate) one or more filling stations, determine a number of filling stations at a location, determine a maintenance status of filling stations, determine an estimated fill time for one or more vehicles at a filling stations and/or to determine if one or more filling stations are public or private. Additional, and/or alternative vehicle data that may be useful to collect, store, and/or analyze, such as to identify a location of one or more filling stations, may be recognized by those of ordinary skill in the art.

Figure 3:
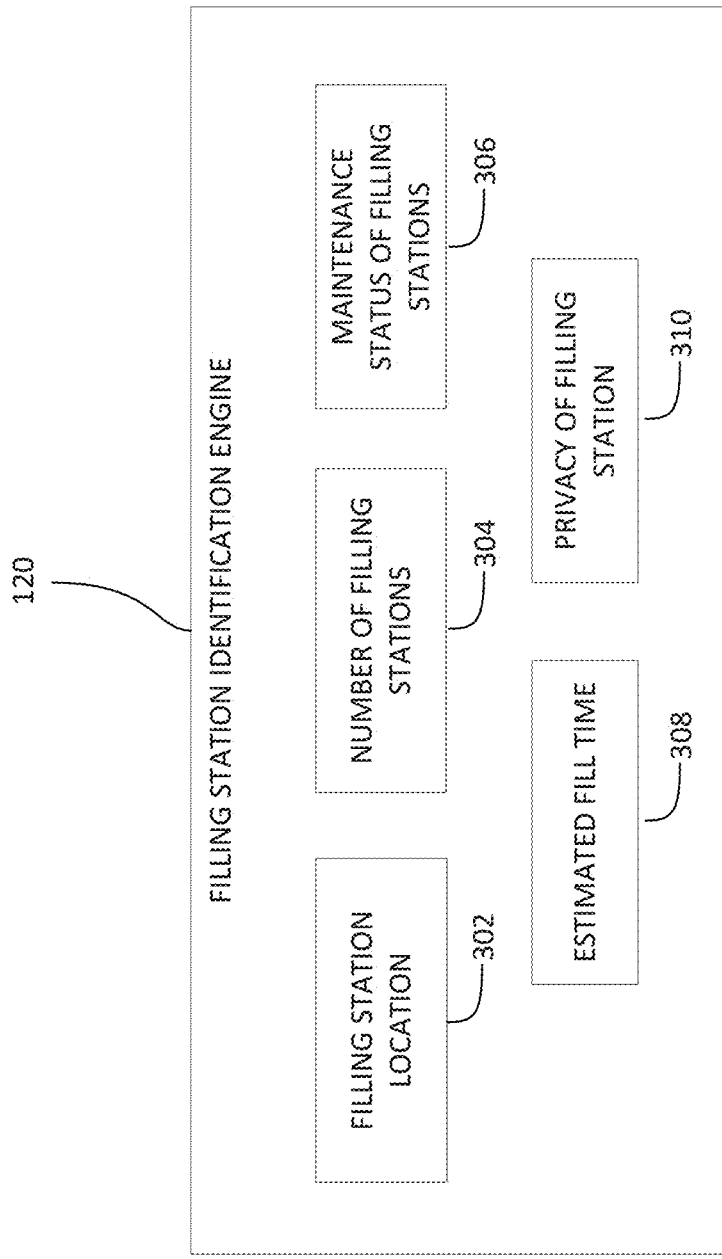
FIG. 3 illustrates a detailed schematic of a portion of the example system of FIG. 1 according to some aspects described herein.

FIG. 3 illustrate a detailed schematic of the filling station identification engine or component 120 of the example system 100. The filling station identification component 120 includes a plurality of components or engines that implement various aspects of the filling station identification component 120. For example, the filling station identification component 120 can include a filling station location component 302, a number of filling stations component 304, a maintenance status of filling stations component 306, an estimated fill time 308, and a privacy of filling stations component 310.

The filling station location component 302 may contain (e.g., stored in a memory location corresponding to the filling station location component 302), and/or generate an indication of a filling station location. For example, the filling station may be a gas station or an electric vehicle charging station. The filling station component 302 may receive a location of one or more vehicles (e.g., from the vehicle location component 208) and an indication of a change in fuel or charge level of the one or more vehicles (e.g., via the change in fuel or charge level component 204). If the fuel or charge level increases at the location, by greater than a predetermined threshold, then it may be determined that a filling station is at the location.

In some examples, the filling station location component 302 may compare one or more locations of filling stations (e.g., that are identified by the filling station location component 302) to a database. The database may include existing location information for one or more filling stations. If one or more of the one or more locations identified by the filling station location component 302 do not correspond to the existing location information from the database, then it may be determined that the one or more of the one or more locations corresponds to new filling stations. Indications may be generated that correspond to the new filling stations, using mechanisms described further herein.

The number of filling stations component 304 may contain (e.g., stored in a memory location corresponding to the number of filling stations component 304), and/or generate an indication of a number of filling stations at a location. For example, if a number of vehicles are at a location, and each of the number of vehicles are increasing a fuel or charge level simultaneously, then a number of filling stations at the location may be equal to the number of vehicles. Accordingly, the number of filling stations at a location may correspond to the number of vehicles that can increase a fuel or charge level, at the same time, at the location, as determined based on vehicle data. The number of vehicles at the location may be determined based on the number of unique vehicle values (e.g., from the unique vehicle values component 210) that are within a configurable range (e.g., 500 feet) of each other, based on the locations of the vehicles (e.g., from the vehicle location component 208).

The maintenance status of filling stations component 306 may contain (e.g., stored in a memory location corresponding to the maintenance status of filling stations 306), and/or generate an indication of a maintenance status of one or more filling stations. The maintenance status may indicate that one or more filling stations are broken (e.g., non-operational). Additionally, or alternatively, the maintenance status may indicate that one or more filling stations are working (e.g., operational). For example, if a vehicle is at a location that is known to correspond to a filling station, for a duration of time that is greater than a predetermined threshold (e.g., 5 minutes, 10 minutes, 15 minutes, etc.), and the vehicle does not increase in a level of charge or fuel, then it may be determined that the filling station is broken. Alternatively, if a vehicle is at a location that is known to correspond to a filling station, and the vehicle increases in a level of charge or fuel, beyond a predetermined threshold, then it may be determined that the filling station is working.

The maintenance status of filling stations may be beneficial to notify maintenance or service workers that a filling station needs to be repaired (e.g., if it is broken). Accordingly, if mechanisms disclosed herein determine that a filling station is broken, an alert may be generated, and in some examples, the alert may be transmitted, to notify maintenance or service workers that the filling stations needs to be repaired. Additionally, or alternatively, the maintenance status of filling stations may correspond to an indication that is provided to a user, to notify a user of the maintenance status. Therefore, if a filling station is broken, a user can choose to travel to a different filling station, without having to spend time or resources to travel to the broken filling station. A map may also be updated to indicate the specific filling station is broken and out of service. This may trigger a map update for all vehicles in the neighborhood.

The estimated fill time component 308 may contain (e.g., stored in a memory location corresponding to the estimated fill time component 308), and/or generate an indication of an estimated amount of time until one or more vehicles are filled to a predetermined threshold. The predetermined threshold may be one of about 50% of a fuel or charge capacity of each of the one or more vehicles, about 75% of a fuel or charge capacity of each of the one or more vehicles, or about 100% of a fuel or charge capacity of each of the one or more vehicles. The estimated fill time component 308 may receive vehicle data corresponding to a rate at which the one or more vehicles are fueled and/or charged, a current fuel and/or charge level of the one or more vehicles, and/or a fuel or charge capacity of the one or more vehicles, to calculate an estimated amount of time until the one or more vehicles are filled to the predetermined threshold.

The privacy of filling station component 310 may contain (e.g., stored in a memory location corresponding to the privacy of filling station component 310), and/or generate an indication of whether a filling station is a public filling station or a private filling station. For example, if relatively few vehicles (e.g., less than 5 unique vehicles) use a filling station, within a configurable period of time (e.g., 2 weeks), then it may be determined that the filling station is a private filling station. Determining the number of unique vehicles that attending a filling station may be based on the unique vehicle value component 210. Additionally, or alternatively, if a filling station is consistently used at about the same time each day (e.g., an electric vehicle is left charging at a residential building every night, after a person returns from work), then it may be determined that the filling station is a private filling station.

Alternatively, if relatively many vehicles (e.g., greater than 5 unique vehicles) use a filling station, within a configurable period of time (e.g., 2 weeks), then it may be determined that the filling station is a public filling station. Additionally, or alternatively, if a filling station is used frequently throughout the period of a day, then it may be determined that the filling station is a public filling station.

Generally, the filling station identification engine 120 can identify a location of one or more filling stations, a number of filling stations at a location, a maintenance status of filling stations, an estimated fill time of one or more vehicles at one or more filling stations, and a privacy status of one or more filling stations (e.g., based on vehicle data). The filling station identification engine 120 can be useful for tracking up-to-date information regarding filling stations to improve driver's ability to plan travel logistics and/or to improve user engagement with mapping services, such as mapping software.

Figure 4:
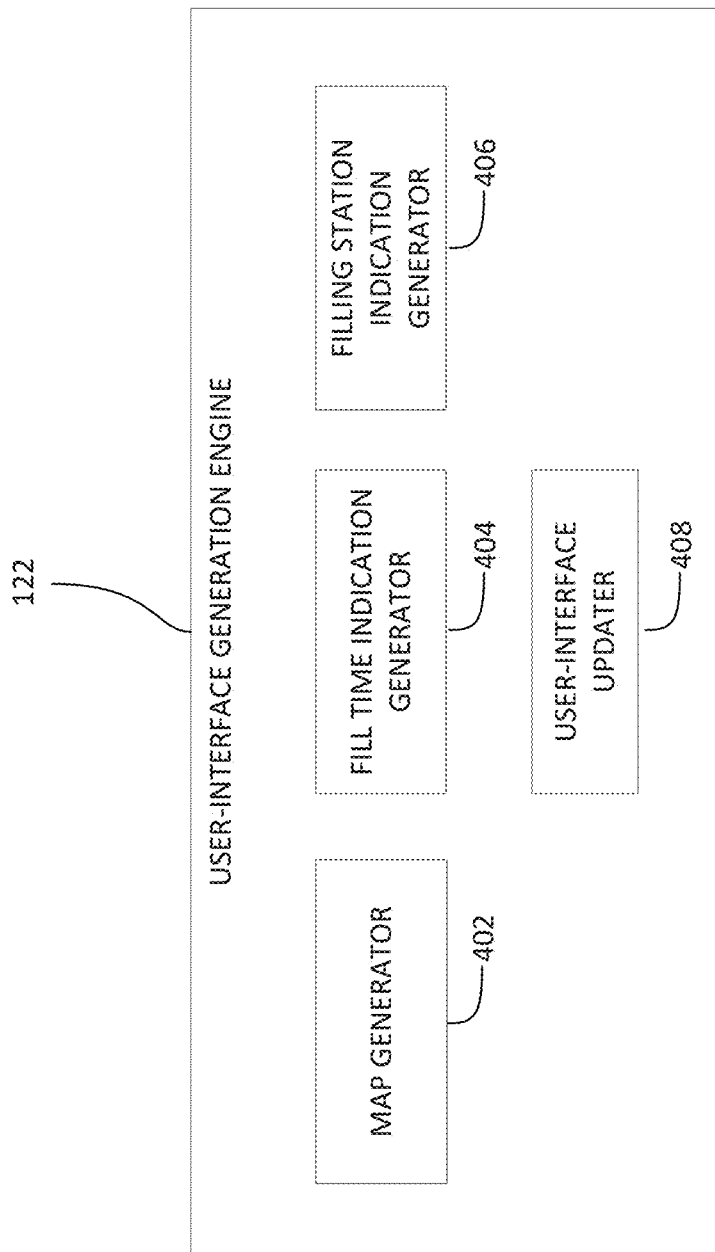
FIG. 4 illustrates a detailed schematic of a portion of the example system of FIG. 1 according to some aspects described herein.

FIG. 4 illustrates a detailed schematic of the user-interface generation engine or component 122 of the example system 100. The user-interface generation component 122 includes a plurality of components or engines that implement various aspects of the user-interface generation component 122. For example, the user-interface generation component 122 can include a map generator component 402, a fill time indication generator component 404, a filling station indication generator component 406, and/or a user-interface updater component 408.

The map generator component 402 may contain (e.g., stored in a memory location corresponding to the map generator component 402), and/or generate an indication of a map. The map may be located on a display screen of a computing device (e.g., computing device 102 of FIG. 1). The map may be a satellite map, a road map, a drawing of a map, a partial map, or any kind of map. The map may include one or more roads (e.g., based on road data source 108) and/or geographic positioning identifiers (e.g., lines of longitude and latitude). Additionally, or alternatively, the map may include one or more indications corresponding to a respective one or more filling stations. Additionally, or alternatively, the map may include one or more indications corresponding to fill times of one or more vehicles at one or more filling stations, which may correspond to an amount of time until a filling station is available for use. Additional features of maps that may be incorporated with mechanisms disclosed herein may be recognized by those of ordinary skill in the art.

The fill time indication generator component 404 may contain (e.g., stored in a memory location corresponding to the fill time indication generator component 404), and/or generate one or more indications of respective fill times for a corresponding one or more vehicles at a respective one or more filling stations. The one or more fill time indications may be visual indications and/or audio indications. Further, the one or more fill time indications may include estimated times (e.g., hours, minutes, and/or seconds) until a vehicle (e.g., gas vehicle, electric vehicle, hybrid vehicle, etc.) is fully filled (e.g., charged, filled with gas, etc.). The estimated fill times may be received from an estimated fill time component, such as the estimated fill time component 308.

Additionally, or alternatively, the one or more fill time indications may be based on a corresponding threshold. For example, a first indication may correspond to the estimated fill time of a vehicle being less than a first threshold (e.g., a first estimated fill time), a second indication may correspond to the estimated fill time of a vehicle being greater than the first threshold and less than a second threshold (e.g., a second estimated fill time), and a third indication may correspond to the estimated fill time of a vehicle being greater than the second threshold. It should be recognized that in some examples there may be any number of indications and/or any number of thresholds on which the indications are determined. Each of first, second, and third indications may be different. For example, the indications may be different colors, patterns, shapes, icons, sizes, brightness, contrast, animations, etc.

The filling station indication generator component 406 may contain (e.g., stored in a memory location corresponding to the indication generator component 406), and/or generate one or more indications corresponding to one or more filling stations (e.g., as identified by the filling station identification component 120). The one or more indications may be visual indications and/or audio indications. In some examples, the one or more indications may differ, based on the filling station to which the one or more indications correspond. For example, the one or more indications can correspond to a type of filling stations (e.g., a gas station or an EV charging station). Additionally, or alternatively, the one or more indications can correspond to a privacy status of the filling stations (e.g., whether a filling station is private or public). Further, the one or more indications can correspond to a maintenance status of the filling stations (e.g., whether a filling station is operational or non-operational).

Each of the filling station indications that are generated by the filling station indication generator component 406 may be different. For example, the indications may be different colors, patterns, shapes, icons, sizes, brightness, contrast, animations, etc. Additionally, or alternatively, each of the filling station indications that are generated by the filling station indication generator component 406 may be the same. For example, the indications may be the same colors, patterns, shapes, icons, sizes, brightness, contrast, animations, etc.

The user-interface updater component 408 may contain (e.g., stored in a memory location corresponding to the user-interface updater component 408), and/or generate one or more intervals at which one or more components of the user-interface generation component 122 are updated. The one more intervals may be regular intervals or irregular intervals. For example, a map (e.g., generated by the map generator component 402) may periodically be updated with new indicators (e.g., generated by the filling station indication generator 406 and/or the fill time indication generator 404) based on one or more filling station locations and/or fuel or charge level state change data from one or more vehicles.

Generally, the user-interface generation component 122 provides improved user engagement through a user-interface (e.g., of a mapping software or application). User-interfaces generated in accordance with mechanisms disclosed herein may be periodically updated to provide an indication of one or more filling station locations and/or estimated fill times of one or more vehicles at one or more filling stations, such as via a map of the user-interface that may be shown on a display screen of a computing device. Therefore, one or more users can easily be informed, via one or more components of the user-interface generation component, where a filling station may be located, how many filling stations are at a location, a maintenance status of one or more filling stations, a privacy status of one or more filling stations, and/or an estimated fill time of one or more vehicle at one or more filling stations. Therefore, appropriate logistical travel decisions can be made, such as choosing at which of a plurality of filling stations to stop to recharge and/or refuel a vehicle.

Figure 5:
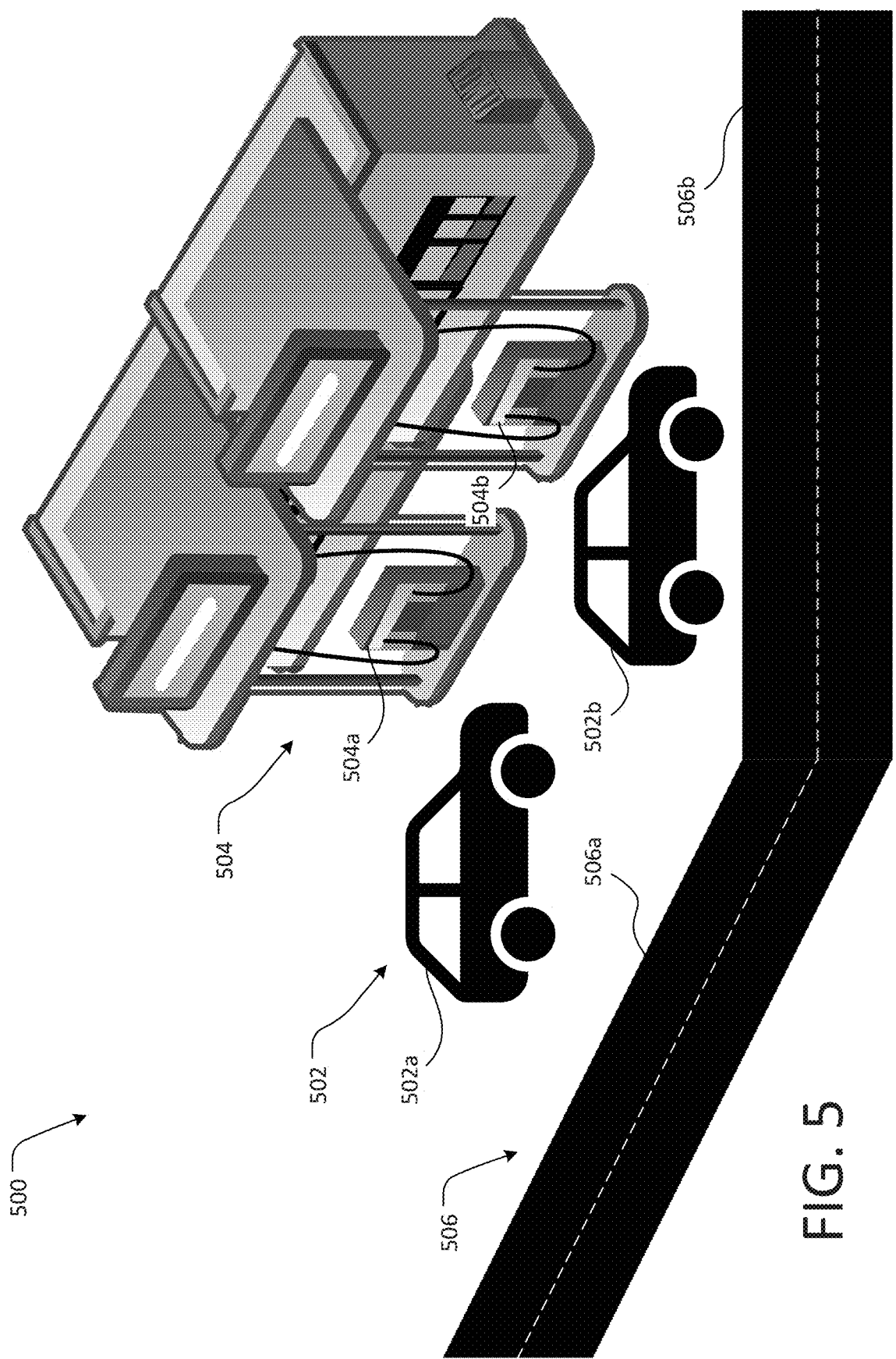
FIG. 5 illustrates an example use-case of mechanisms described herein.

FIG. 5 illustrates an examples use-case 500 of some mechanisms described herein. For example, use-case 500 includes a plurality of vehicles 502 (e.g., a first vehicle 502a and a second vehicle 502b), a plurality of filling stations 504 (e.g., a first filling station 504a and a second filling station 504b), and a plurality of roads 506 (e.g., a first road 506a and a second road 506b). The vehicles 502 may be gas vehicles, electric vehicle, or any other kind of vehicles. The filling stations 504 may be gas stations or electric vehicle (EV) charging stations.

One or more of the plurality of vehicles 502 may include a plurality of sensors (not shown) from which data may be collected therefrom. For example, the vehicles 502 may include one or more sensors that detect a fuel or charge level, a change in the fuel or charge level, a fuel or charge capacity, a vehicle location, a unique vehicle value (which is anonymous, and may change, such as based on distance travelled by a vehicle, geographic limitations, periods of time, etc.), and/or camera data. Each of the plurality of sensors may send data to, or store data in, the vehicle data analysis engine 118, discussed with respect to FIG. 2.

Mechanisms disclosed herein may identify a location of the filling stations 504. For example, one or more of the vehicles 502 may increase in an amount of fuel or charge, while stopped at the filling stations 504. The increase in the amount of fuel or charge may be greater than a predetermined threshold (e.g., to filter out fluctuations in sensor readings that may not be the result of receiving fuel or electricity at a filling station). Based on the increase in the amount of fuel or charge level of the one or more of the vehicles 502, a location of a corresponding one or more of the filling stations 504 may be identified. The location may be a geographic location (e.g., geographic coordinates based in latitude and longitude). Additionally, or alternatively, the location may be a street address based on road data (e.g., road data 114) corresponding to one or more roads (e.g., roads 506).

If there are a plurality of vehicles 502 that are increasing in an mount of fuel or charge, above the predetermined threshold, and within a configurable proximity to each other (e.g., within 500 feet), then it may be determined that there are a plurality of filling stations 504. The number of filling stations 504 may correspond to the number of unique vehicles 502 that are able to increase in a level of fuel or charge, within the configurable proximity, at the same time.

Referring to the first vehicle 502a and the first filling station 504a, in some examples, a location of the first filling station 504a may be known. Accordingly, if the first vehicle 502a is stopped at the first filling station 504a for longer than a predetermined amount of time (e.g., 15 minutes), without a fuel or charge level of the first vehicle 502a being increased, then it may be determined that the first filling stations 504a is broken or non-operational. Further, in some examples, if the first vehicle 502a is stopped at the first filling station 504a for longer than the predetermined amount of time, and leaves the first filling stations 504a, without a fuel or charge level of the first vehicle 502a being increased, then it may be determined that the first filling station 504a is broken or non-operational.

It should be recognized that while the example use-case 500 includes two vehicles and two filling stations, in some examples there may be greater than or less than two vehicles and/or greater than or less than two filling stations. Additional, and/or alternative examples in accordance with mechanisms described herein may be recognized by those of ordinary skill in the art. For example, a privacy status of the filling stations 504 may be determined, an estimated fill time of the vehicles 502 may be determined, and/or additional estimations or classifications based on vehicle data and/or road data may be determined, as recognized by those of ordinary skill in the art.

Figure 6:
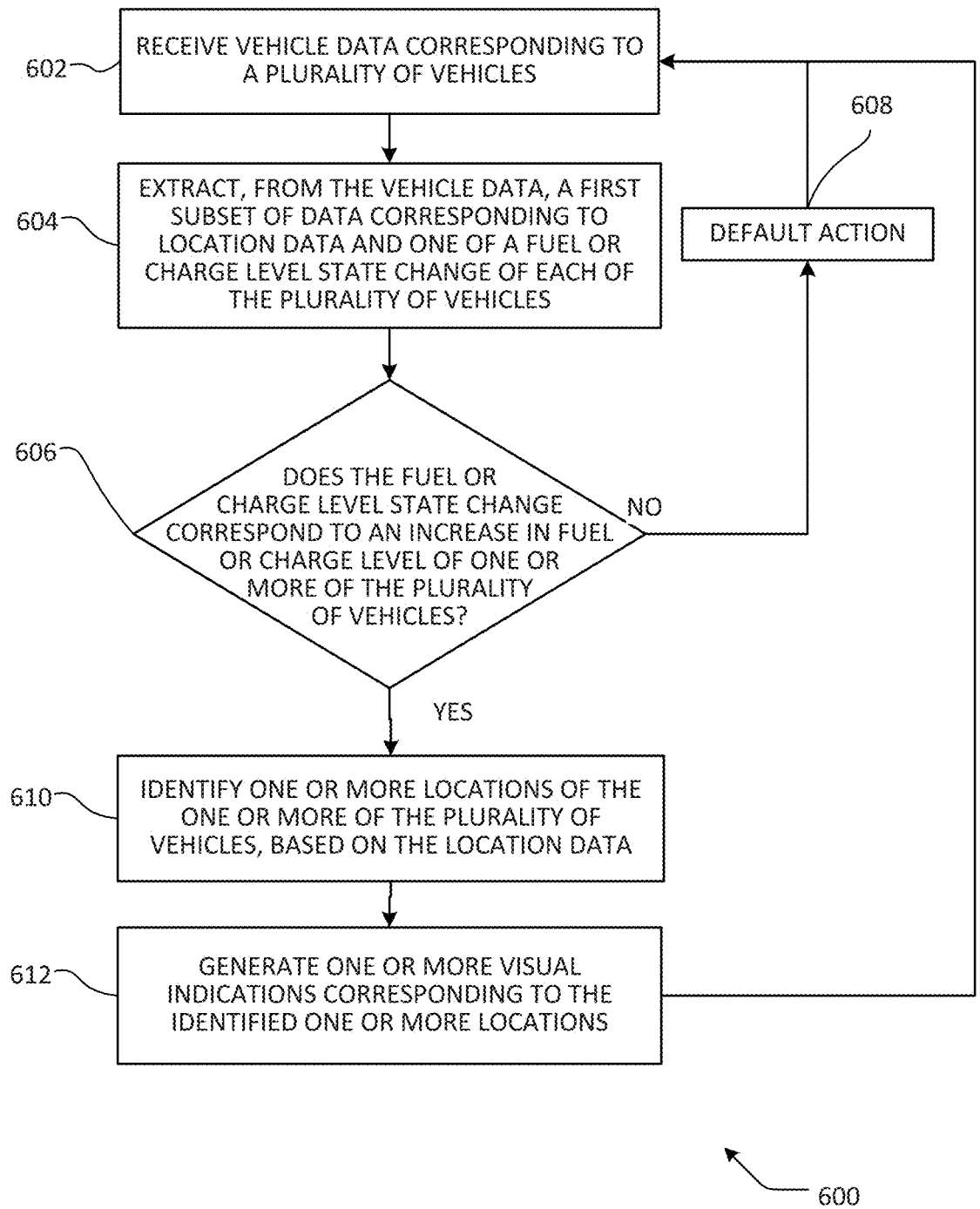
FIG. 6 illustrates an example method of identifying filling stations, according to some aspects described herein.

FIG. 6 illustrates an example method 600 of identifying filling stations, according to some aspects described herein. In examples, aspects of method 600 are performed by a device, such as computing device 102 and/or server 104, discussed above with respect to FIG. 1.

Method 600 beings at operation 602 wherein vehicle data (e.g., vehicle data 112) is received that corresponds to a plurality of vehicles (e.g., vehicles 502). The vehicle data may be received in real time or near real time. For example, each of the plurality of vehicles may include sensors that generate vehicle data, and the vehicle data may be communicated to a computing device (e.g., computing device 102) and/or a network (e.g., network 110). In some examples, road data may further be received (e.g., road data 114), such as to assist in determining the location of one or more filling stations.

In some examples, the vehicle data is electric vehicle (EV) data that corresponds to one or more electric vehicles. Additionally, or alternatively, in some examples, the vehicle data is gas-powered vehicle data that corresponds to one or more gas vehicles. Therefore, method 600 may be used to identify one or more filling stations (e.g., filling stations 504) that are gas stations and/or EV charging stations.

At operation 604, a first subset of data is extracted from the vehicle data. The first subset of data may correspond to location data of each of the plurality of vehicles. Further, the first subset of data may correspond to one of a fuel or charge level state change of each of the plurality of vehicles. In some examples, subsets of data may further be extracted that correspond to one of a fuel or charge capacity of a vehicle, a unique vehicle value (which is anonymous, and may change, such as based on distance travelled by a vehicle, geographic limitations, periods of time, etc.), and/or camera data. Additional and/or alternative subsets of vehicle data may be extracted that correspond to any one or more of a plurality of sensors that may be found in modern-day vehicles.

At determination 606, it is determined if the fuel or charge level state change corresponds to an increase in fuel or charge level of one or more of the plurality of vehicles. For example, if a vehicle is at a filling station, then it may be getting recharged and/or refueled. Therefore, the fuel or charge level state change of the vehicle may increase greater than a predetermined threshold. The predetermined threshold may be an increase that is greater than approximately 11% of a fuel or charge capacity level, or approximately 3% of a fuel or charge capacity level, or approximately 5% of a fuel or charge capacity level, or approximately 10% of a fuel or charge capacity level, etc. The predetermined threshold may help to exclude fluctuations in sensor readings of an increase in a fuel or charge level that may not be indicative of a vehicle being refueled or recharged. Data not indicative of the vehicle being refueled or recharged may be suppressed from the system or archived and further utilized to identify these potentially misleading signals through feedback loops.

If it is determined that the fuel or charge level state change does not correspond to an increase in fuel or charge level of the one or more of the plurality of vehicles, flow branches "NO" to operation 608, where a default action is performed. For example, the vehicle data and/or the first subset of data may have an associated pre-configured action. In other examples, method 600 may comprise determining whether the vehicle data and/or the first subset of data has an associated default action, such that, in some instances, no action may be performed as a result of the received vehicle data. Method 600 may terminate at operation 608. Alternatively, method 600 may return to operation 602 to provide an iterative loop of receiving vehicle data corresponding to a plurality of vehicles and determining if a fuel or charge level state change, of one or more of the plurality of vehicles, is increasing.

If however, it is determined that the fuel or charge level state change does correspond to an increase in fuel or charge level of one or more of the plurality of vehicles, flow instead branches "YES" to operation 610, where, based on the location data, one or more locations of the one or more of the plurality of vehicles is identified. The one or more location may be identified via the vehicles data analysis engine 118. Further, the one or more locations may correspond to the location of one or more filling stations (e.g., gas stations and/or EV charging stations), as determined, for example, by the filling station identification engine 120.

Flow advances to operation 612, where one or more visual indications may be generated corresponding to the identified one or more locations (e.g., the locations of one or more filling stations, such as EV charging stations and/or gas stations). The one or more visual indications may be displayed on a map, such as a map that may be generated on a computing device (e.g., computing device 102). The one or more visual indications may be generated using one or more components of the user-interface generation engine 122, described earlier herein with respect to FIG. 4.

Generally, mechanisms disclosed herein allow for one or more filling stations to be identified, and for corresponding indications to be generated, based on a change in a fuel or charge level of one or more vehicles, as well as a location of the one or more vehicles. The ability to identify filling stations may be useful to maintain up-to-date filling station in mapping services, such as mapping software, that may be used by users to improve logistical planning, when travelling. Further advantages may be apparent to those of ordinary skill in the art.

Method 600 may terminate at operation 612. Alternatively, method 600 may return to operation 602 (or any other operation from method 600) to provide an iterative loop, such as of receiving vehicle data corresponding to a plurality of vehicles, identifying one or more locations of one or more of the plurality of vehicles, when a fuel or charge level state change, corresponding to one or more of the plurality of vehicles, increases, and generating one or more visual indications corresponding to the identified one or more locations (e.g., which may be locations of filling stations).

Figure 7:
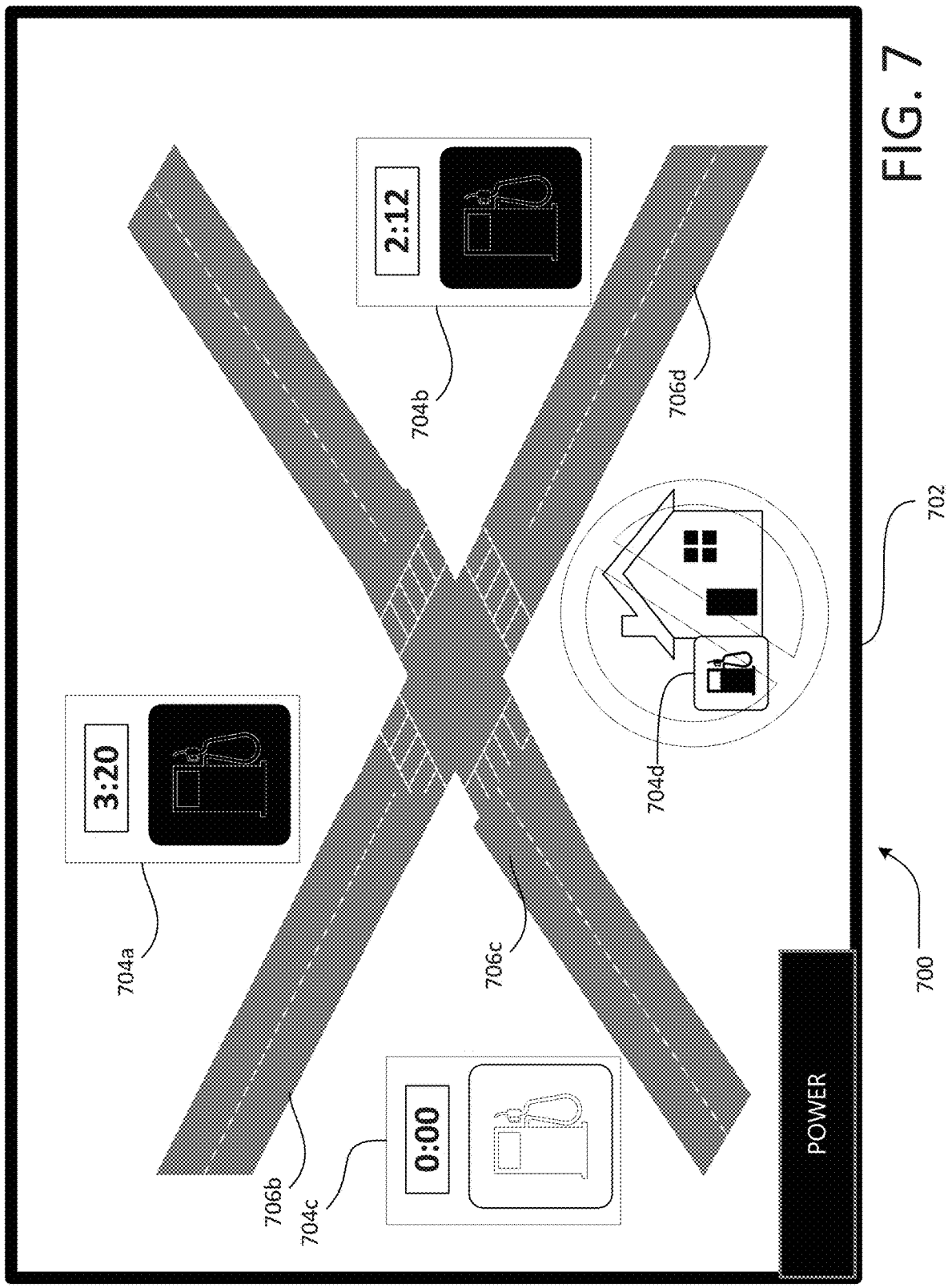
FIG. 7 illustrates an example system of generating indications corresponding to filling stations, according to some aspects described herein.

FIG. 7 illustrates an example system 700 of generating indications corresponding to filling stations, according to some aspects described herein. The example system 700 includes a computing device 702. The computing device 702 may be a mobile computing device (e.g., smartphone, smartwatch, tablet, etc.) or an infotainment system of a vehicle (e.g., vehicle 502). Additionally, or alternatively, the computing device 702 may be similar to the computing 102 described earlier herein with respect to FIG. 1.

The example system 700 further includes a first indication 704a, a second indication 704b, a third indication 704c, and a fourth indication 704d (collectively the "indications 704"). The indications 704 may each be visual indications. Additionally, or alternatively, the indications 704 may be audio indications. The indications 704 may correspond to filling stations (e.g., filling stations 504).

Each of the plurality of indicators 704 may be differentiated from each other based on different colors, icons, shapes, text, sizes, animations, patterns, brightness, contrasts, locations on a map, locations on a display screen, and/or other visually differentiating characteristics. Additionally, or alternatively, each of the plurality of indicators 704 may be differentiated from each other based on different audio sounds, such as different pitches, tones, vocals, frequencies, or other auditory differentiating characteristics.

The example system 700 further includes a first road 706a, a second road 706b, a third road 706c, and a fourth road 706d (collectively the "roads 706"), which may define, at least in part, a map. The plurality of indications 704 may be disposed relative to the plurality of roads 706. Additionally, or alternatively, a location of each of the plurality of indications 704 may be independent of a location of each of the plurality of roads 706. Rather, the location of each of the plurality of indications 704 may be defined with respect to geographic coordinates, such as latitudinal and longitudinal points.

In some examples, one or more of the plurality of indications 704 may correspond a location of a filling station, as well as an estimated amount of time until a vehicle at the filling station reaches a predetermined threshold of a fuel or charge level. The predetermined threshold may be about 50% of a fuel or charge capacity of the vehicle, or about 75% of a fuel or charge capacity level of the vehicle, or about 100% of a fuel or charge capacity level of the vehicle. The estimated fill time may be a time that decreases (e.g., via the user-interface update 408) as a vehicle is filled up. As shown in FIG. 7, a vehicle at a filling station corresponding to the first indication 704a may have an estimated fill time of 3 minutes and 20 seconds, while a vehicle at a filling station corresponding to the second indication 704b may have an estimated fill time of 2 minutes and 12 seconds. Additionally, or alternatively, if a filling station is available (e.g., there is no vehicle at the filling station and/or an estimated fill time of a vehicle at the filling station is zero), then the indication (e.g., the third indication 704c) may indicate that the filling station is available.

In some examples, using mechanisms described herein, it may be determined that one or more filling stations are one of public or private filling stations. The indications 704 may include an indication of whether the one or more charging stations are public or private. Additionally, or alternatively, an indication corresponding to a private filling station (e.g., the fourth indication 704d) may not be displayed on a map (e.g., of the computing device 702). As may be recognized by those of ordinary skill in the art, some filling stations, such as gas stations or EV charging stations may be located on private property (e.g., residential property or commercial property that is not publicly accessible) for the exclusive use of certain individuals, families, employees, etc. It may be undesirable for private filling stations to be publicly displayed. Therefore, mechanisms disclosed herein provide the option to not display one or more indications (e.g., the fourth indication 704d) that correspond to private filling stations.

As discussed earlier herein, the locations of filling stations may be newly identified. Further, maintenance status of filling stations may be updated and estimated fill times of vehicles at filling stations may be updated, as vehicle data is collected (e.g., with respect to time). Accordingly, indicators (e.g., indicators 704) corresponding to the filling stations may be generated, re-generated, and/or replace each other, depending on updated vehicle data (e.g., fuel or charge level data, location data, etc.) that is received from one or more vehicles.

Figure 8:
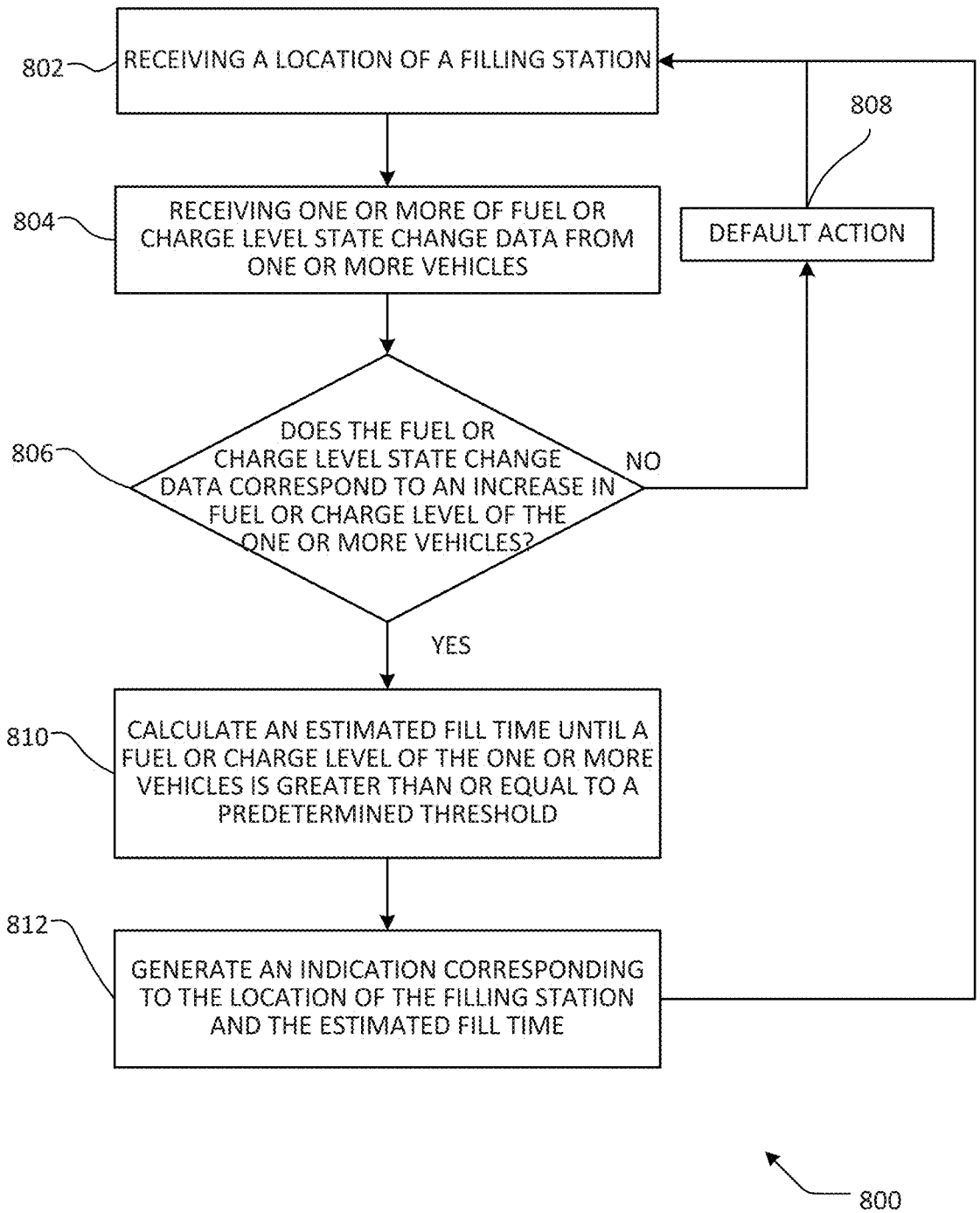
FIG. 8 illustrates an example method of generating indications corresponding to filling stations, according to some aspects described herein.

FIG. 8 illustrates an example method 800 of generating indications corresponding to filling stations, according to some aspects described herein. In examples, aspects of method 800 are performed by a device, such as computing device 102 and/or server 104, discussed above with respect to FIG. 1.

Method 800 begins at operation 802, wherein a location of a filling station is received. In some examples a plurality of locations corresponding to a plurality of filling stations are received. The filling stations may be similar to the filling stations 504 discussed earlier herein with respect to FIG. 5. For example, the filling stations may be gas stations and/or EV charging stations. Further, the location of the filling stations may be geographic coordinates (e.g., latitudinal and longitudinal coordinate points) and/or street addresses.

At operation 804, one or more of fuel or charge level state data from one or more vehicles is received. The one or more of fuel or charge level state data may be extracted from vehicle data (e.g., vehicle data 112) that is received from a plurality of vehicles (e.g., vehicles 502). In some examples, the one or more of fuel or charge level state data may be fuel level state data, such as in examples where the one or more vehicles include gas-powered vehicles. Additionally, or alternatively, in some examples, the one or more of fuel or charge level state data may be charge level state data, such as in examples where the one or more vehicles include electric vehicles. The fuel or charge level state data may be stored and/or generated by the vehicle data analysis engine 118, described earlier herein with respect to FIG. 2.

At determination 806, it is determined if the fuel or charge level state change corresponds to an increase in fuel or charge level of the one or more vehicles. For example, if a vehicle is at a filling station, then it may be getting recharged and/or refueled. Therefore, the fuel or charge level state change of the vehicle may increase greater than a predetermined threshold. The predetermined threshold may be an increase that is greater than approximately 1% of a fuel or charge capacity level, or approximately 3% of a fuel or charge capacity level, or approximately 5% of a fuel or charge capacity level, or approximately 10% of a fuel or charge capacity level, etc. The predetermined threshold may help to exclude fluctuations in sensor readings of an increase in a fuel or charge level that may not be indicative of a vehicle being refueled or recharged.

If it is determined that the fuel or charge level state change does not correspond to an increase in fuel or charge level of the one or more of the plurality of vehicles, flow branches "NO" to operation 808, where a default action is performed. For example, the location of the filling station and/or the fuel or charge level state change data may have an associated pre-configured action. In other examples, method 800 may comprise determining whether the location of the filling station and/or the fuel or charge level state change data may have an associated default action, such that, in some instances, no action may be performed as a result of the received location and/or data. Method 800 may terminate at operation 808. Alternatively, method 800 may return to operation 802 to provide an iterative loop of receiving a location of a filling station, receiving fuel or charge level state change data from one or more vehicles, and determining if the fuel or charge level state change, of the one or more vehicles, is increasing.

If however, it is determined that the fuel or charge level state change does correspond to an increase in fuel or charge level of the one or more vehicles, flow instead branches "YES" to operation 810, where, an estimated fill time until a fuel or charge level of the one or more vehicle is calculated (e.g., via the estimated fill time component 308 of FIG. 3). The estimated fill time may be an estimated fill time until the fuel or charge level of the one or more vehicles is greater than or equal to a predetermined threshold. For example, the predetermined threshold may be one of about 50% of a fuel or charge capacity of each of the one or more vehicles, about 75% of a fuel or charge capacity of each of the one or more vehicles, or about 100% of a fuel or charge capacity of each of the one or more vehicles.

Flow advances to operation 812, wherein an indication is generated that corresponds to the location of the filling station and the estimated fill time. The indication may be similar to one or more of the indications 704, described earlier herein with respect to FIG. 7. The operations 812 may further comprise generating a plurality of indications that each correspond to a respective one of a plurality of filling stations and estimated fill times of vehicles respectively thereat. Further, the indications may be displayed on a map, such as a map that is displayed on a computing device.

Generally, mechanisms disclosed herein allow for one or more indications to be generated that communicate to a user the location of one or more filling stations, as well as an estimated fill time of vehicles at the one or more filling stations. Therefore, users that receive the one or more indications can effectively plan to which of a plurality of filling stations they should go to recharge and/or refuel their vehicle, while decreasing an amount of time that they may otherwise have to wait for a vehicle that is currently at a filling station to finish refueling or recharging. Further advantages may be apparent to those of ordinary skill in the art.

Figure 9:
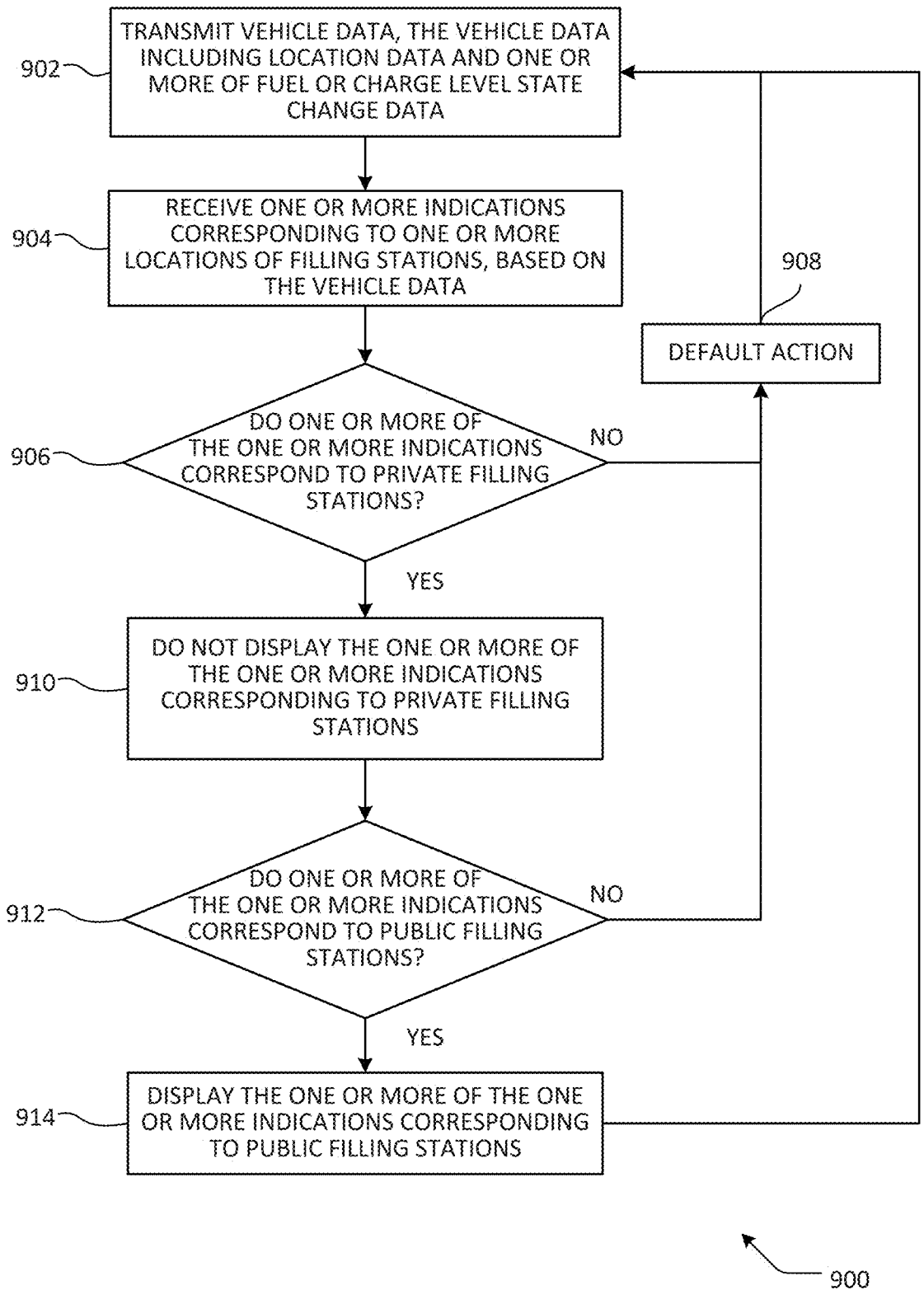
FIG. 9 illustrates an example method of generating indications corresponding to filling stations, according to some aspects described herein.

FIG. 9 illustrates an example method 900 of generating indications corresponding to filling stations. In examples, aspects of method 900 are performed by a device, such as computing device 102 and/or server 104, discussed above with respect to FIG. 1.

Method 900 beings at operation 902, wherein vehicle data is transmitted. The vehicle data may be transmitted from a vehicle data source (e.g., vehicle data source 106). The vehicle data source may be a vehicle, such as a sensor of a vehicle, a computing device or server that aggregates vehicle data, and/or an infotainment system of a vehicle. The vehicle data may include location data and one or more of fuel or charge level state change data. The location data may correspond to location data that may be stored in the vehicle location component 208, discussed earlier herein with respect to FIG. 2.

At operation 904, one or more indications may be received that correspond to one or more locations of filling stations, based on vehicle data. The one or more indications may be generated using, for example, one or more aspects of method 600 and/or method 800. Alternatively, the one or more indications may be generated using additional and/or alternative mechanisms known to those of ordinary skill in the art.

At determination 906, it is determined if one or more of the one or more indications correspond to private filling stations. For example, one or more of the one or more indications may contain metadata or other information corresponding to private filling stations. Additionally, or alternatively, it may be determined, based on the vehicle data of operation 902, that one or more of the one or more indications correspond to private filling stations (e.g., using mechanisms described earlier herein with respect to the privacy of filling station component 310). Private filling stations may be suppressed or pruned from a map of publicly available filling stations.

If it is determined that one or more of the one or more indications do not correspond to private filling station, flow branches "NO" to operation 908, where a default action is performed. For example, the one or more filling stations may have an associated pre-configured action. In other examples, method 900 may comprise determining whether the one or more filling stations have an associated default action, such that, in some instances, no action may be performed as a result of the received one or more indications. Method 900 may terminate at operation 908. Alternatively, method 900 may return to operation 902 to provide an iterative loop of transmitting vehicle data, receiving one or more indications corresponding to one or more location of filling stations, and determining if the one or more indications correspond to private filling stations.

If however, it is determined that one or more of the one or more indications do correspond to private filling stations, flow instead branches "YES" to operation 910, wherein the one or more of the one or more indications that correspond to private filling stations are not displayed. For example, the one or more of the one or more indications may be hidden on a display screen, such as a display screen of an infotainment system of a vehicle, a display screen of a mobile computing device, or a display screen of another computing device that is similar to computing device 102.

At determination 912, it is determined if one or more of the one or more indications correspond to public filling stations. For example, the one or more indications may contain metadata or other information corresponding to public filling stations. Additionally, or alternatively, it may be determined, based on the vehicle data of operation 902, that the one or more indications correspond to public filling stations (e.g., using mechanisms described earlier herein with respect to the privacy of filling station component 310).

If it is determined that one or more of the one or more indications do not correspond to public filling station, flow branches "NO" to operation 908, where a default action is performed. For example, the one or more filling stations may have an associated pre-configured action. In other examples, method 900 may comprise determining whether the one or more filling stations have an associated default action, such that, in some instances, no action may be performed as a result of the received one or more indications. Method 900 may terminate at operation 908. Alternatively, method 900 may return to operation 902 to provide an iterative loop of transmitting vehicle data, receiving one or more indications corresponding to one or more location of filling stations, and determining if the one or more indications correspond to public filling stations.

If however, it is determined that one or more of the one or more indications do correspond to public filling stations, flow instead branches "YES" to operation 914, wherein the one or more of the one or more indications that correspond to public filling stations are displayed. For example, the one or more of the one or more indications may be visually displayed on a display screen, such as a display screen of an infotainment system of a vehicle, a display screen of a mobile computing device, or a display screen of another computing device that is similar to computing device 102. The one or more of the one or more indications may be visually displayed on a map (e.g., shown on a display screen), based on geographic locations corresponding to the one or more of the one or more indications and/or street addressed corresponding to the one or more of the one or more indications.

Generally, mechanisms disclosed herein allow for improved user-engagement (e.g., via a user-interface) by providing indicators that correspond to identifying information of filling stations (e.g., location, maintenance status, privacy status, number, estimated fill time of vehicles thereat, etc.). Further advantages may be apparent to those of ordinary skill in the art.

Method 900 may terminate at operation 914. Alternatively, method 900 may return to operation 902 (or any other operation from method 900) to provide an iterative loop, such as of transmitting vehicle data and displaying, or not displaying, one or more indications corresponding to filling stations, based on a privacy status of the filling stations.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of computing device configurations that may be utilized for practicing aspects of the disclosure, described herein.

Figure 10:
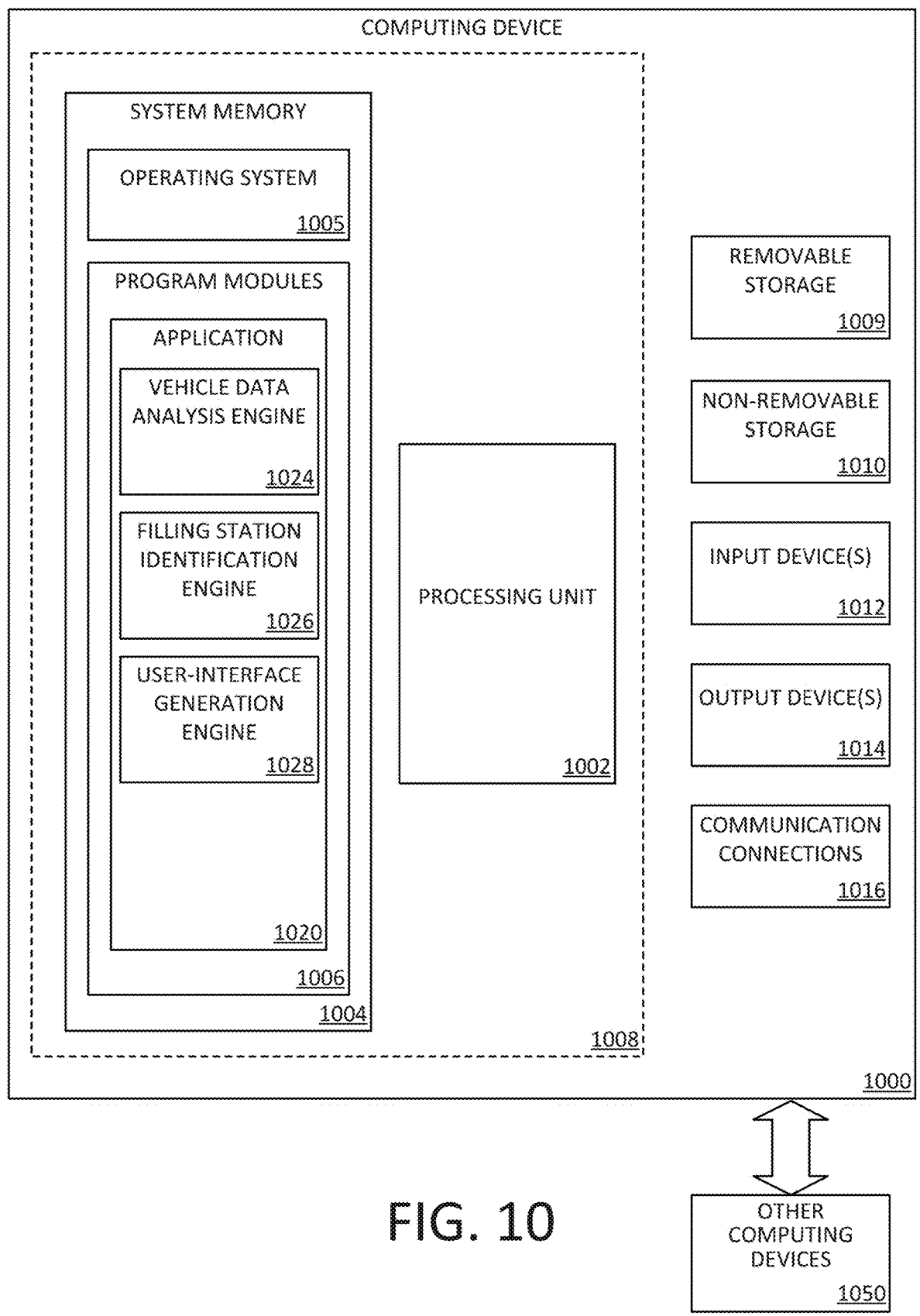
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above, including computing device 102 in FIG. 1. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories.

The system memory 1004 may include an operating system 1005 and one or more program modules 1006 suitable for running software application 1020, such as one or more components supported by the systems described herein. As examples, system memory 1004 may store vehicle data analysis engine or component 1024, filling station identification engine or component 1026, and/or user-interface generation engine or component 1028. The operating system 1005, for example, may be suitable for controlling the operation of the computing device 1000.

Furthermore, aspects of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., application 1020) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media.

Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000.

Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
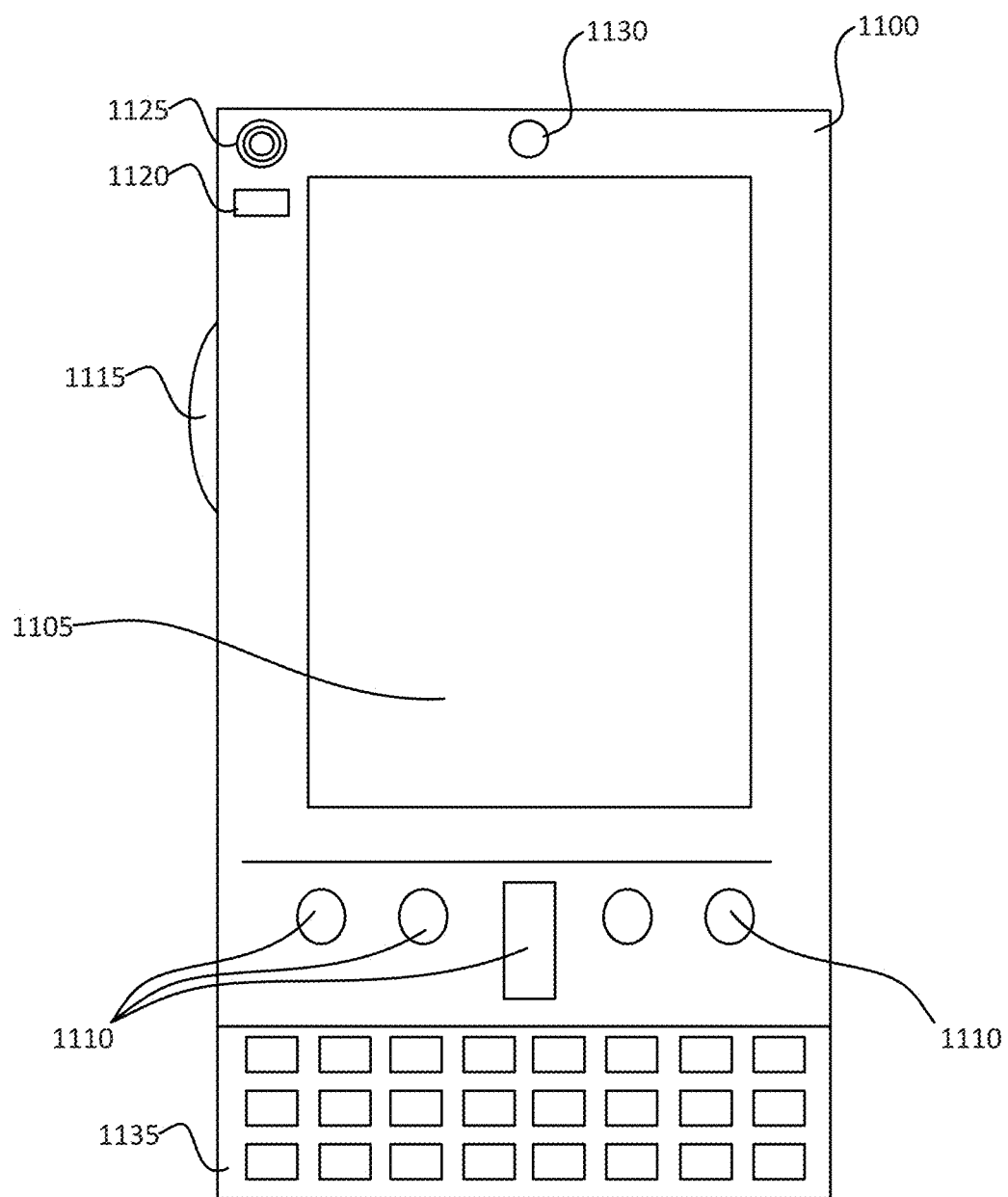
FIGS. 11A and 11B are simplified block diagrams of a mobile computing device with which aspects of the present disclosure may be practiced.
Figure 11B:
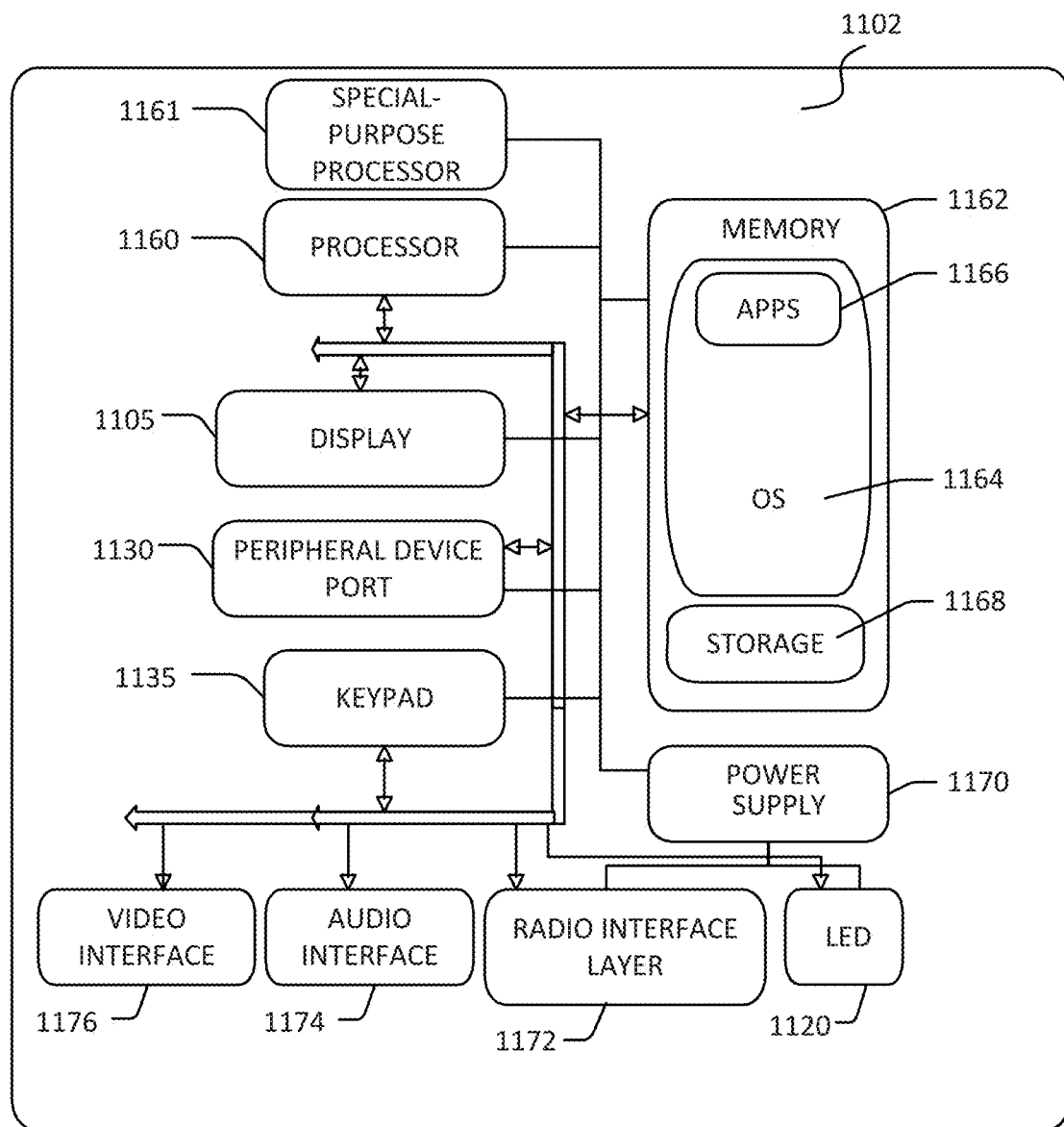

FIGS. 11A and 11B illustrate a mobile computing device 1100, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The one or more input buttons 1110 may be "soft" buttons that are generated on the touch screen display. The display 1105 of the mobile computing device 1100 may also function as an input device (e.g., a touch screen display).

If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some examples.

In yet another alternative example, the mobile computing device 1100 is a portable phone system, such as a cellular phone. The mobile computing device 1100 may also include an optional keypad 1135. Optional keypad 1135 may be a physical keypad or a "soft" keypad generated on the touch screen display.

In various examples, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In some examples, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100 described herein (e.g., a vehicle data analysis engine, a filling station identification engine, a user-interface generation engine, etc.).

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via the audio transducer 1125. In the illustrated example, the visual indicator 1120 is a light emitting diode (LED) and the audio transducer 1125 is a speaker. These devices may be directly coupled to the power supply 1170 so that when activated, they remain on for a duration dictated by the notification mechanism even though the processor 1160 and/or special-purpose processor 1161 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with aspects of the present disclosure, the microphone may also serve as an audio sensor to facilitate control of notifications, as will be described below. The system 1102 may further include a video interface 1176 that enables an operation of an on-board camera 1130 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
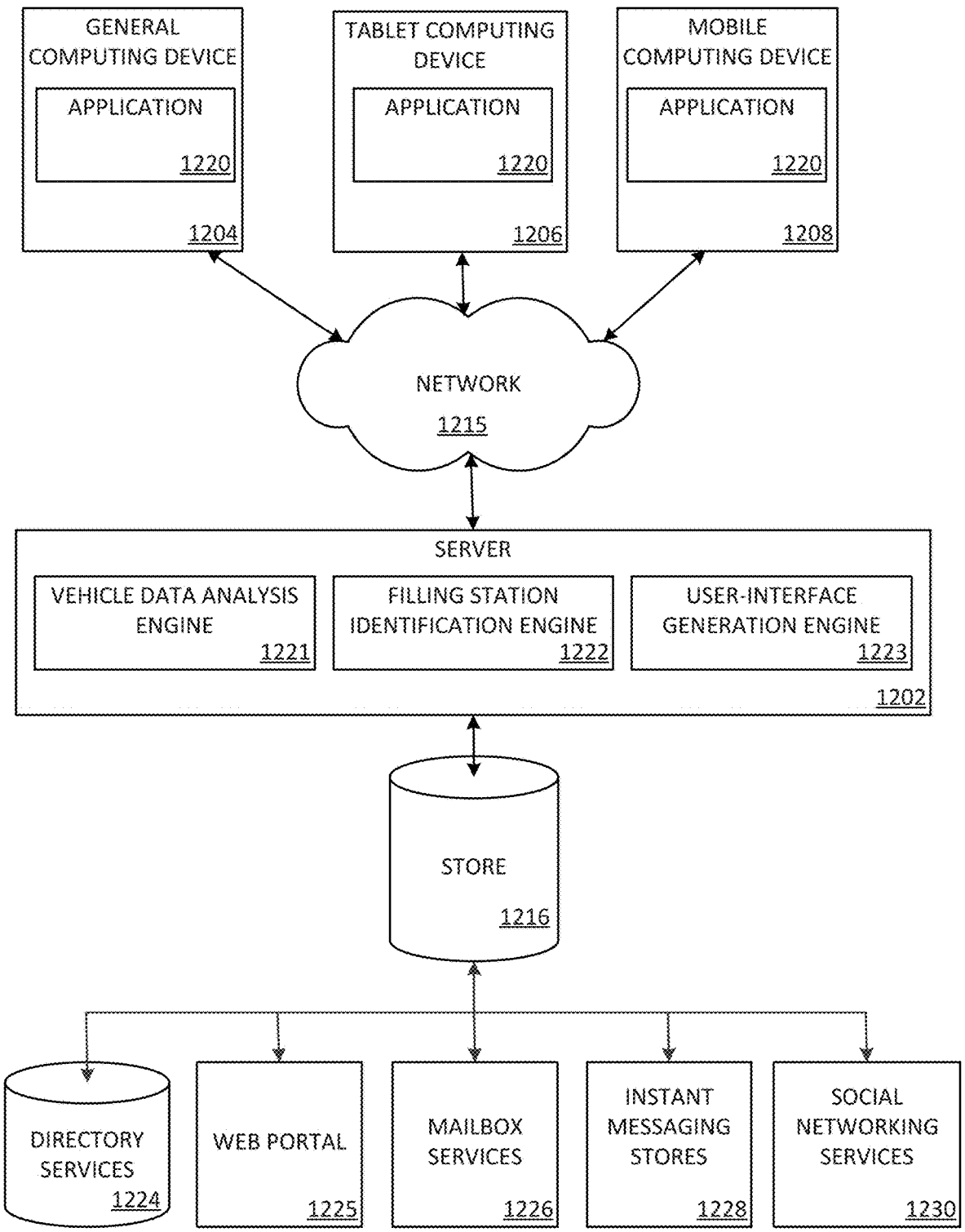
FIG. 12 is a simplified block diagram of a distributed computing system in which aspects of the present disclosure may be practiced.

FIG. 12 illustrates one aspect of the architecture of a system for processing data received at a computing system from a remote source, such as a personal computer 1204, tablet computing device 1206, or mobile computing device 1208, as described above. Content displayed at server device 1202 may be stored in different communication channels or other storage types. For example, various documents may be stored using a directory service 1224, a web portal 1225, a mailbox service 1226, an instant messaging store 1228, or a social networking site 1230.

An application 1220 (e.g., similar to the application 1020) may be employed by a client that communicates with server device 1202. Additionally, or alternatively, vehicle data analysis engine 1221, filling station identification engine 1222, and/or user-interface generation engine 1223 may be employed by server device 1202. The server device 1202 may provide data to and from a client computing device such as a personal computer 1204, a tablet computing device 1206 and/or a mobile computing device 1208 (e.g., a smart phone) through a network 1215. By way of example, the computer system described above may be embodied in a personal computer 1204, a tablet computing device 1206 and/or a mobile computing device 1208 (e.g., a smart phone). Any of these examples of the computing devices may obtain content from the store 1216, in addition to receiving graphical data useable to be either pre-processed at a graphic-originating system, or post-processed at a receiving computing system.

Figure 13:
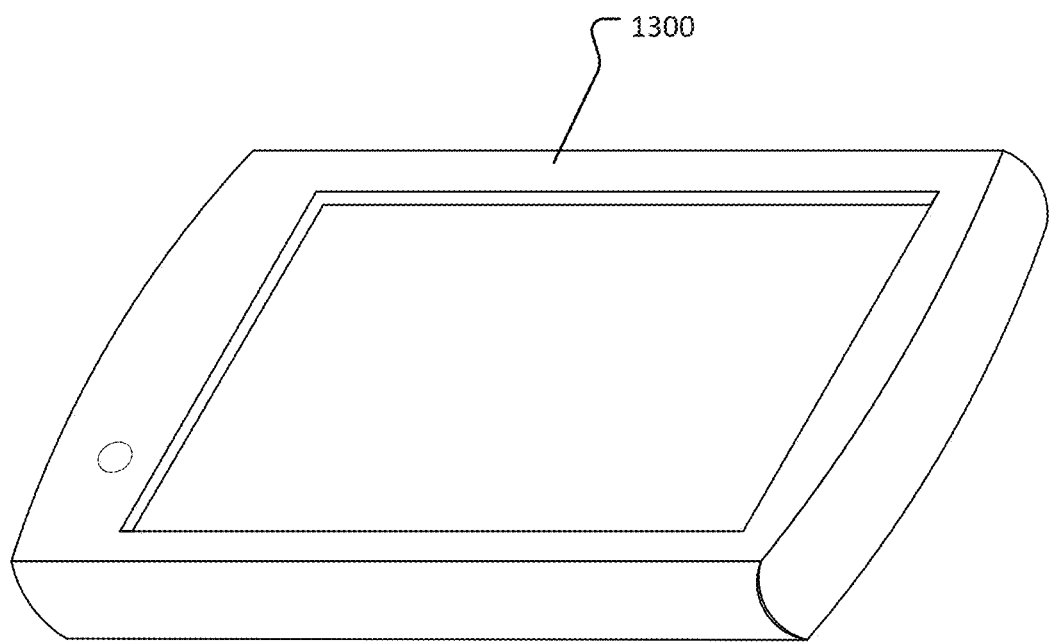
FIG. 13 illustrates a tablet computing device for executing one or more aspects of the present disclosure.

FIG. 13 illustrates an exemplary tablet computing device 1310 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, the method comprising:
receiving vehicle data aggregated from sensors onboard a plurality of vehicles, the sensors including a global position system and a fuel or charge level reader, and the plurality of vehicles including a first vehicle and a second vehicle;
extracting, from the vehicle data, a first subset of data corresponding to location data from the global positioning system and one of a fuel or charge level state change of each of the plurality of vehicles from the fuel or charge level reader;
identifying a location of the first vehicle, based on the location data, when the fuel or charge level state change corresponds to an increase in a fuel or charge level of the first vehicle;
comparing the identified location of the first vehicle to a database of one or more known locations of filling stations to determine that the identified location of the first vehicle is a new filling station location because the database of one or more known locations of filling stations does not include the identified location of the first vehicle;

identifying a location of the second vehicle, based on the location data, to be at a known filling station based on the database of one or more known locations of filling stations because the database of one or more known locations of filling stations includes the location of the second vehicle;

determining the known filling station at the location of the second vehicle is non-operational because, based on the vehicle data and the fuel or charge level state change data, the fuel or charge level state change of the second vehicle does not increase while the second vehicle is at the known filling station;

updating the database of one or more known locations of fillings stations to include the identified location of the new filling station and an indication of the known filling station being non-operational;

in response to the updating the database of one or more known locations of filling stations, generating a first visual indication corresponding to the identified location of the new filling station included in the updated database and a second visual indication corresponding to the known filling station being non-operational; and causing the first visual indication and the second visual indication to be displayed on a graphical user interface, thereby providing an indication to one or more users of the new filling station location and the known filling station being non-operational.

2. The method of claim 1, wherein the graphical user interface comprises a map, and wherein the first visual indication and the second visual indication are caused to be displayed on the map.

3. The method of claim 1, wherein the vehicle data aggregated from sensors onboard the plurality of vehicles is received at a remote server.

4. The method of claim 1, wherein the vehicle data is electric vehicle (EV) data corresponding to one or more electric vehicles, and wherein the first visual indication corresponds to one or more charging stations.

5. The method of claim 4, further comprising:
determining, based on the EV data, whether one or more charging stations are public or private,
wherein the first visual indication comprises an indication of whether the one or more charging stations are public or private.

6. The method of claim 1, wherein the vehicle data is gas vehicle data corresponding to one or more gas vehicles, and wherein the first visual indication corresponds to a gas station.

7. The method of claim 1, further comprising:
determining an estimated fill time until a fuel or charge level of the one or more of the plurality of vehicles is approximately 100%,
wherein the first visual indication comprises an indication of the estimated fill time.

8. The method of claim 1, wherein the fuel or charge level state changes corresponds to an increase in a fuel or charge level of the one or more of the plurality of vehicles that is greater than approximately 10%.

9. The method of claim 1, wherein the vehicle data includes a value for each of the one or more vehicles, wherein, based on the respective value for each of the one or more vehicles and the first subset of data, a number of filling stations at the one or more locations is determined, and wherein the first visual indication corresponds to the number of filling stations at the one or more locations.

10. A method, the method comprising:
receiving a location of a filling station;
receiving one or more of fuel or charge level state change data from a fuel or charge level reader onboard each vehicle of one or more vehicles and a fuel or charge capacity level corresponding to the one or more vehicles;
determining whether the fuel or charge level state change data corresponds to an increase in fuel or charge level of the one or more vehicles being greater than approximately one percent of the fuel or charge capacity level when a location of the one or more vehicles is at the location of the filling station based on location data from a global positioning system onboard the one or more vehicles, thereby excluding fluctuations in sensor readings of the fuel or charge level state change data not indicative of the one or more vehicles being refueled or recharged;
in response to determining that the fuel or charge level state change data does correspond to an increase in fuel or charge level of the one or more vehicles being greater than approximately one percent of the fuel or charge capacity level when a location of the one or more vehicles is at the location of the filling station based on location data from a global positioning system onboard the one or more vehicles, calculating an estimated fill time until a fuel or charge level of the one or more vehicles is greater than or equal to a predetermined threshold, wherein the calculating comprises:
receiving a current fuel or charge level corresponding to the one or more vehicles;
storing the fuel or charge level state change data with a corresponding time stamp; and
calculating the estimated fill time, using the current fuel or charge level, the fuel or charge capacity level, the fuel or charge level stage change data, and the time stamp;
generating an indication corresponding to the location of the filling station and the estimated fill time; and
causing the indication to be displayed on a graphical user interface, thereby providing an indication to one or more users of the location of the filling station and the estimated fill time.

11. The method of claim 10, wherein the graphical user interface comprises a map, and the method further comprises:
displaying the indication on the map.

12. The method of claim 10, wherein the predetermined threshold is one of about 50% of a fuel or charge capacity of each of the one or more vehicles, about 75% of a fuel or charge capacity of each of the one or more vehicles, or about 100% of a fuel or charge capacity of each of the one or more vehicles.

13. The method of claim 10, wherein the filling station is a gas station, wherein the one or more vehicles are gas vehicles, and wherein the indication corresponds to the location of the gas station and the estimated fill time.

14. The method of claim 10, wherein the filling station is a charging station, wherein the one or more vehicles are electric vehicles, and where in the indication corresponds to the location of the charging station and the estimated fill time.

15. A non-transitory computer-readable storage medium comprising instructions that when executed by one or more processors cause the one or more processors to perform a set of operations comprising:
- receiving vehicle data aggregated from sensors onboard a plurality of vehicles, the sensors including a global position system and a fuel or charge level reader, and the plurality of vehicles including a first vehicle and a second vehicle;
- extracting, from the vehicle data, a first subset of data corresponding to location data from the global positioning system and one of a fuel or charge level state change of each of the plurality of vehicles from the fuel or charge level reader;
- identifying a location of the first vehicle, based on the location data, when the fuel or charge level state change corresponds to an increase in a fuel or charge level of the first vehicle;
- comparing the identified location of the first vehicle to a database of one or more known locations of filling stations to determine that the identified location of the first vehicle is a new filling station location because the database of one or more known locations of filling stations does not include the identified location of the first vehicle;
- identifying a location of the second vehicle, based on the location data, to be at a known filling station based on the database of one or more known locations of filling stations because the database of one or more known locations of filling stations includes the location of the second vehicle;
- determining the known filling station at the location of the second vehicle is non-operational because, based on the vehicle data and the fuel or charge level state change data, the fuel or charge level state change of the second vehicle does not increase while the second vehicle is at the known filling station;
- updating the database of one or more known locations of fillings stations to include the identified location of the new filling station and an indication of the known filling station being non-operational;
- in response to the updating the database of one or more known locations of filling stations, generating a first visual indication corresponding to the identified location of the new filling station included in the updated database and a second visual indication corresponding to the known filling station being non-operational; and
- causing the first visual indication and the second visual indication to be displayed on a graphical user interface, thereby providing an indication to one or more users of the new filling station location and the known filling station being non-operational.

16. The non-transitory computer-readable storage medium of claim 15, wherein the graphical user interface comprises a map, and wherein the first visual indication and the second visual indication are caused to be displayed on the map.

17. The non-transitory computer-readable storage medium of claim 15, wherein the vehicle data is electric vehicle (EV) data corresponding to one or more electric vehicles, and wherein the first visual indication corresponds to one or more charging stations.

18. The non-transitory computer-readable storage medium of claim 17, wherein the set of operations further comprise:
- determining, based on the EV data, whether one or more charging stations are public or private,
- wherein the first visual indication comprises an indication of whether the one or more charging stations are public or private.

19. The non-transitory computer-readable storage medium of claim 15, wherein the vehicle data is gas vehicle data corresponding to one or more gas vehicles, and wherein the first visual indication corresponds to a gas station.

20. The non-transitory computer-readable storage medium of claim 15, wherein the fuel or charge level state changes corresponds to an increase in a fuel or charge level of the one or more of the plurality of vehicles that is greater than approximately 10%.

* * * * *